US008383212B2

(12) United States Patent
Obata et al.

(10) Patent No.: US 8,383,212 B2
(45) Date of Patent: Feb. 26, 2013

(54) ALIGNMENT FILM AND METHOD OF MANUFACTURING THE SAME, PHASE DIFFERENCE DEVICE AND METHOD OF MANUFACTURING THE SAME, AND DISPLAY UNIT

(75) Inventors: Kei Obata, Miyagi (JP); Junichi Inoue, Tochigi (JP); Akito Kuriyama, Tochigi (JP); Akihiro Shibata, Miyagi (JP); Kentaroh Ishikawa, Tochigi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/895,993

(22) Filed: Oct. 1, 2010

(65) Prior Publication Data

US 2011/0085106 A1    Apr. 14, 2011

(30) Foreign Application Priority Data

Oct. 9, 2009 (JP) ............................... P2009-235509
Apr. 21, 2010 (JP) ............................... P2010-097757
Jul. 21, 2010 (JP) ............................... P2010-163944

(51) Int. Cl.
*G02F 1/13363* (2006.01)
(52) U.S. Cl. ........... 428/1.3; 349/117; 349/123; 428/1.2
(58) Field of Classification Search ............ 428/1.2–1.6, 428/156–169; 349/117–118, 121–136
See application file for complete search history.

(56) References Cited

U.S. PATENT DOCUMENTS

| 7,083,834 B2 | 8/2006 | Kuntz et al. | |
|---|---|---|---|
| 2003/0108710 A1* | 6/2003 | Coyle et al. | 428/64.4 |
| 2003/0137626 A1 | 7/2003 | Khazova et al. | |
| 2003/0189684 A1* | 10/2003 | Kuntz et al. | 349/123 |
| 2005/0118355 A1* | 6/2005 | Kuntz et al. | 428/1.1 |
| 2007/0020404 A1* | 1/2007 | Seiberle et al. | 428/1.2 |
| 2007/0191506 A1* | 8/2007 | Lu et al. | 522/178 |
| 2008/0055521 A1* | 3/2008 | Mizutani et al. | 349/96 |
| 2009/0002612 A1* | 1/2009 | Tamaki | 349/117 |
| 2009/0136687 A1* | 5/2009 | Seiberle et al. | 428/1.2 |
| 2009/0147162 A1* | 6/2009 | Yeom et al. | 349/33 |
| 2009/0207360 A1* | 8/2009 | Takeda et al. | 349/129 |
| 2009/0290118 A1* | 11/2009 | Lu et al. | 349/191 |
| 2010/0110360 A1* | 5/2010 | Chao et al. | 349/191 |

FOREIGN PATENT DOCUMENTS

| JP | HEI 08-174741 | 7/1996 |
|---|---|---|
| JP | HEI 09-297310 | 11/1997 |
| JP | 2001-242442 | 9/2001 |
| JP | 3360787 | 10/2002 |
| JP | 2003-251643 | 9/2003 |
| JP | 2003-337223 | 11/2003 |
| JP | 2008-233412 | 10/2008 |
| WO | WO2008-062682 A1 * | 5/2008 |

* cited by examiner

OTHER PUBLICATIONS

Japanese Office Action issued on Aug. 24, 2010 corresponding to Japanese Patent Appln. No. 2010-163944.

*Primary Examiner* — Sophie Hon
(74) *Attorney, Agent, or Firm* — K&L Gates LLP

(57) ABSTRACT

An alignment film or a phase difference device with small shift from a desired alignment direction and a display unit including the same are provided. The alignment film includes: a substrate having a plurality of grooves extending in a specific direction on a surface; and a non-alignment thin film formed along a surface of the plurality of grooves. The phase difference device includes: an alignment film that has a substrate having a plurality of grooves extending in a specific direction on a surface and a non-alignment thin film formed along a surface of the plurality of grooves; and a phase difference layer that is provided being contacted with a surface of the non-alignment thin film, and includes a liquid crystal material that is aligned along an extending direction of a dent formed by the non-alignment thin film and is polymerized.

16 Claims, 17 Drawing Sheets

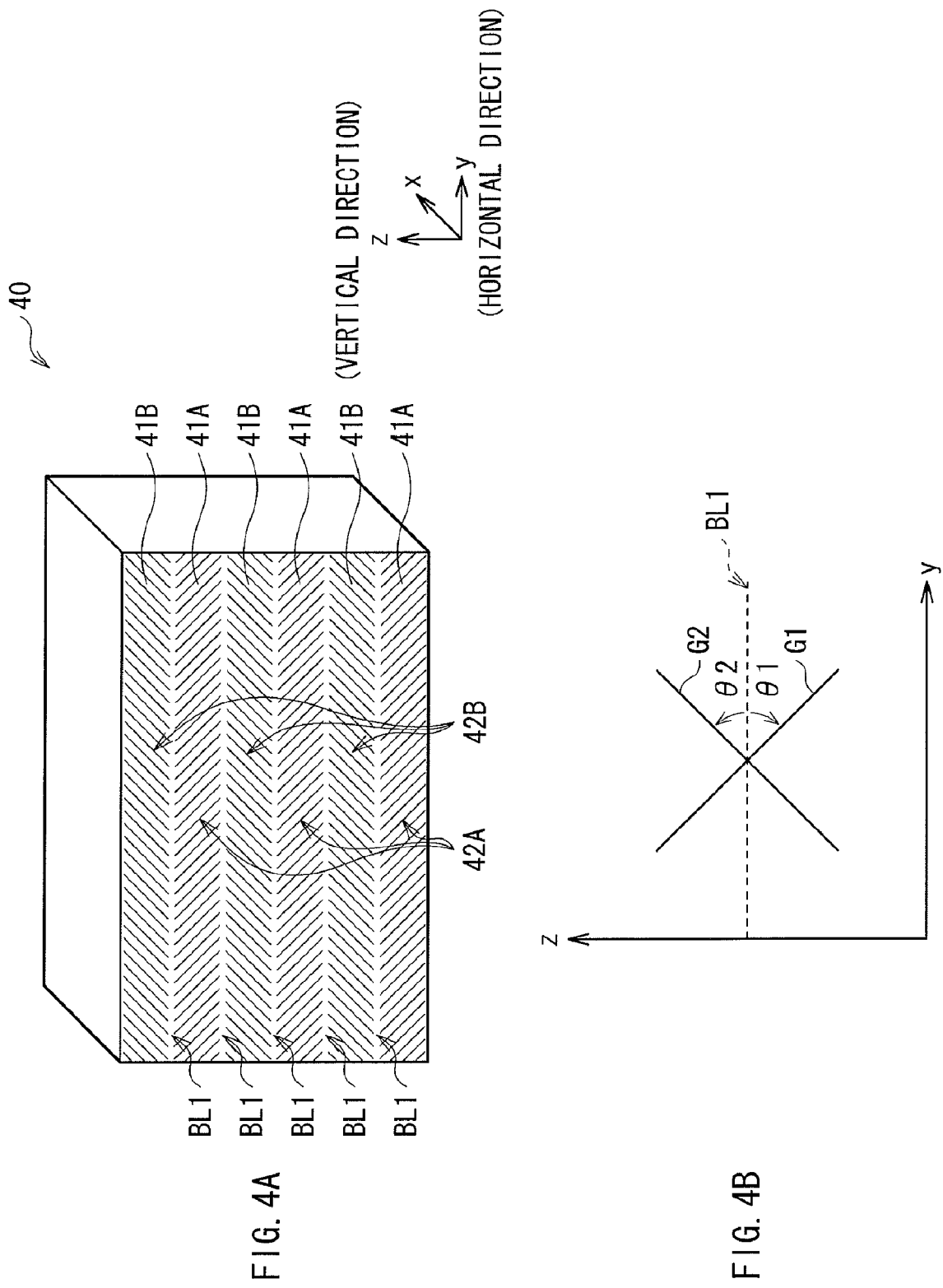

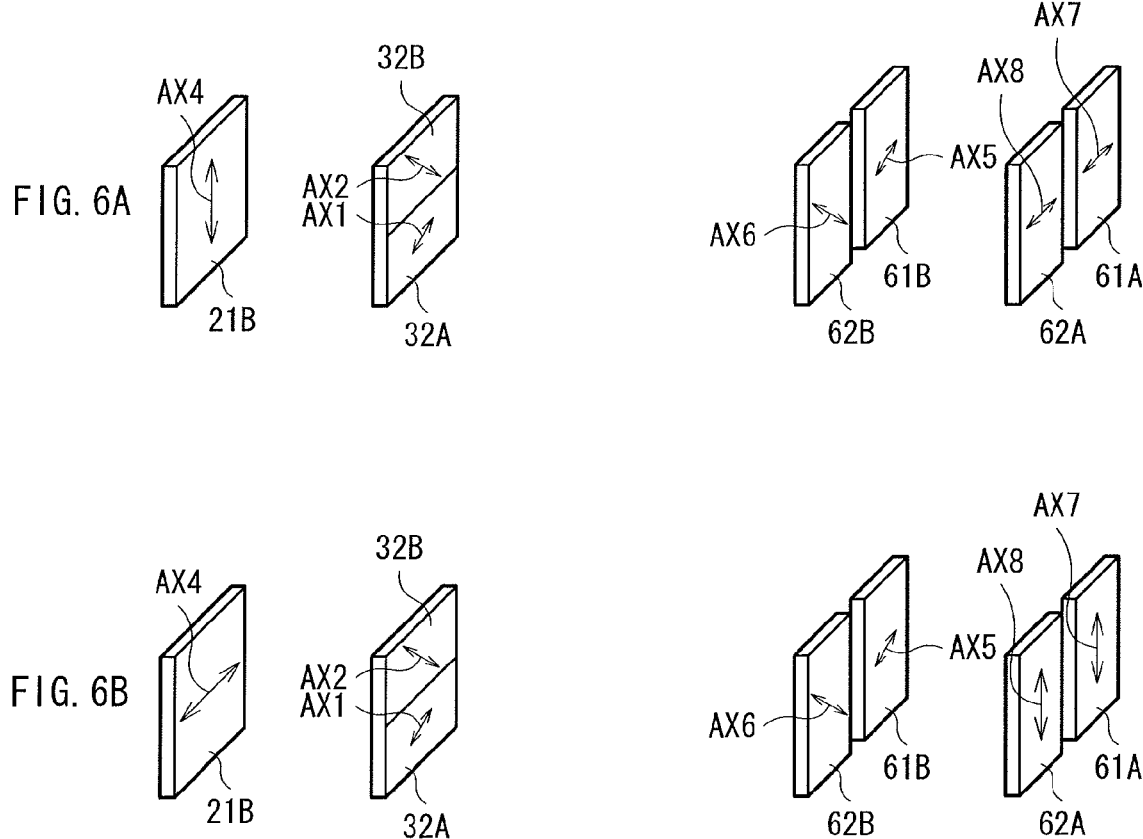

ALIGNMENT FILM AND METHOD OF MANUFACTURING THE SAME, PHASE DIFFERENCE DEVICE AND METHOD OF MANUFACTURING THE SAME, AND DISPLAY UNIT

CROSS REFERENCES TO RELATED APPLICATIONS

The present application claims priority to Japanese Priority Patent Application JP 2009-235509 filed in the Japanese Patent Office on Oct. 9, 2009, Japanese Priority Patent Application JP 2010-097757 filed in the Japanese Patent Office on Apr. 21, 2010 and JP 2010-163944 filed in the Japanese Patent Office on Jul. 21, 2010, the entire contents of which are hereby incorporated by references.

BACKGROUND

The present application relates to an alignment film for controlling alignment and a method of manufacturing the same. The present application further relates to a phase difference device including an alignment film for controlling alignment and a method of manufacturing the same. The present application furthermore relates to a display unit including the foregoing phase difference device.

In the past, as a stereoscopic image display unit using polarized glasses, three has been a display unit in which polarization state of outputted light of a left-eye pixel is different from polarization state of outputted light of a right-eye pixel. In such a display unit, in a state that a viewer wears the polarized glasses, outputted light from the left-eye pixel enters only the left eye, and outputted light from the right-eye pixel enters only the right eye, and thereby a stereoscopic image is able to be observed.

For example, in Japanese Patent No. 3360787, a phase difference device is used for outputting light so that polarization state of outputted light of a left-eye pixel is different from polarization state of outputted light of a right-eye pixel. In the phase difference device, a phase difference region having a slow axis or a phase advance axis in one direction is provided correspondingly to the left-eye pixel, and a phase difference region having a slow axis or a phase advance axis in a direction different from that of the former phase difference region is provided correspondingly to the right-eye pixel.

SUMMARY

The foregoing phase difference device is formed by, for example, coating an alignment film having a rubbing treated surface with a liquid crystalline monomer, and heating and curing the resultant. In the case where the alignment film is coated with the liquid crystalline monomer, the liquid crystalline monomer is aligned by alignment function of the alignment film. The alignment function of the alignment film is mainly expressed by molecular alignment of the surface of the alignment film, but is also expressed by a groove shape on the surface of the alignment film. Thus, alignment direction of the liquid crystalline monomer is determined by alignment action by the molecular alignment of the surface of the alignment film and alignment action by the groove shape on the surface of the alignment film.

The foregoing phase difference device is able to be fabricated, for example, as follows. First, a platy or roll-like master having a left-eye groove shape and a right-eye groove shape is prepared. Next, the surface of a previously prepared optical film is coated with a UV curing resin, and subsequently the master is pressed onto the UV curing resin to cure the UV curing resin. After that, the master is separated from the UV curing resin. As above, a resin layer to which the groove shape of the master is transferred is formed on the optical film. However, in separating the master, it is not easy to align extending directions of all groove shapes with separation direction for the following reason. That is, the extending direction of the left-eye groove shape is different from the extending direction of the right-eye groove shape. Thus, in the foregoing phase difference device, there is a disadvantage that alignment direction of the left-eye phase difference region (liquid crystalline monomer) and the right-eye phase difference region (liquid crystalline monomer) are shifted from a desired direction.

The disadvantage that the alignment directions are shifted from a desired direction exists not only in the foregoing phase difference device, but also in general phase difference devices formed by separating a master in a direction different from extending directions of groove shapes.

In view of the foregoing, in the application, it is desirable to firstly provide an alignment film capable of decreasing possibility that its alignment direction is shifted from a desired alignment direction and a method of manufacturing the same. In the application, it is desirable to secondly provide a phase difference device in which shift of its alignment direction from a desired alignment direction is small and a method of manufacturing the same. In the application, it is desirable to thirdly provide a display unit including the foregoing phase difference device.

According to an embodiment, there is provided an alignment film including a substrate having a plurality of grooves extending in a specific direction on a surface and a non-alignment thin film formed along a surface of the plurality of grooves. The non-alignment thin film is a thin film in which lots of molecules located on the surface of the thin film do not have alignment characteristics, that is, are in each random direction. According to an embodiment, there is provided a phase difference device including the foregoing alignment film and a phase difference layer that is provided being contacted with a surface of the non-alignment thin film. The phase difference layer includes a liquid crystal material that is aligned along an extending direction of a dent formed by the non-alignment thin film and is polymerized. According to an embodiment, there is provided a display unit including a display panel driven based on an image signal, a backlight unit illuminating the display panel, and a phase difference device provided on the side opposite to the backlight unit with respect to the display panel.

In the alignment film, the phase difference device, and the display unit of the embodiment, the non-alignment thin film is formed along the surface of the plurality of grooves formed on the surface of the substrate. Thereby, in the case where a given material is formed on the alignment film in the course of manufacturing, the ratio of influence of molecular alignment of the surface of the substrate on the material on the alignment film is able to be decreased more than in the case where the given material of the alignment film is directly formed on the surface of the plurality of grooves.

According to an embodiment, there is provided a method of manufacturing an alignment film including a first step of forming a plurality of grooves extending in a specific direction on a surface of a substrate and a second step of forming a non-alignment thin film formed along a surface of the plurality of grooves. According to an embodiment, there is provided a method of manufacturing a phase difference device including a first step of forming a plurality of grooves extending in a specific direction on a surface of a substrate, a second step of forming a non-alignment thin film formed along a surface of the plurality of grooves, and a third step of forming a phase difference layer in which a liquid crystal material is aligned along an extending direction of a dent formed by the non-alignment thin film by coating a surface of the non-alignment thin film with the liquid crystal material and polymerizing the liquid crystal material.

In the method of manufacturing an alignment film and the method of manufacturing a phase difference device of the embodiment, the non-alignment thin film is formed along the surface of the plurality of grooves. Thereby, in the case where a given material is formed on the alignment film, the ratio of influence of molecular alignment of the surface of the substrate on the material on the alignment film is able to be decreased more than in the case where the given material is directly formed on the surface of the plurality of grooves.

According to the alignment film, the phase difference device, and the display unit of the embodiment and the method of manufacturing an alignment film and the method of manufacturing a phase difference device of the embodiment, the ratio of influence of molecular alignment of the surface of the substrate on the material on the alignment film is decreased. Thereby, even if the molecules of the surface of the plurality of grooves are aligned in the direction different from the extending direction of the plurality of grooves, for example, alignment direction of the material on the alignment film is able to be aligned with the extending direction of the dent formed by the non-alignment thin film in the course of manufacturing. In the result, possibility that the alignment direction is shifted from a desired direction is able to be decreased. Thereby, a phase difference device with small shift from a desired alignment direction and a display unit including the same are able to be realized.

Additional features and advantages are described herein, and will be apparent from the following Detailed Description and the figures.

BRIEF DESCRIPTION OF THE FIGURES

FIG. 4A is a perspective view illustrating an example of a structure of the substrate of FIG. 3. FIG. 4B is a conceptual diagram illustrating an example of minute grooves formed in the substrate of FIG. 3 in the extending direction.

FIGS. 6A and 6B are conceptual views for explaining a transmission axis and a slow axis in the display unit of FIG. 1.

DETAILED DESCRIPTION

An embodiment will be described in detail with reference to the drawings. The description will be given in the following order.

1. Embodiment (a display unit, a phase difference device, and an alignment film)
2. Modified examples
3. Examples Embodiment Configuration of a Display Unit 1

Figure 1:
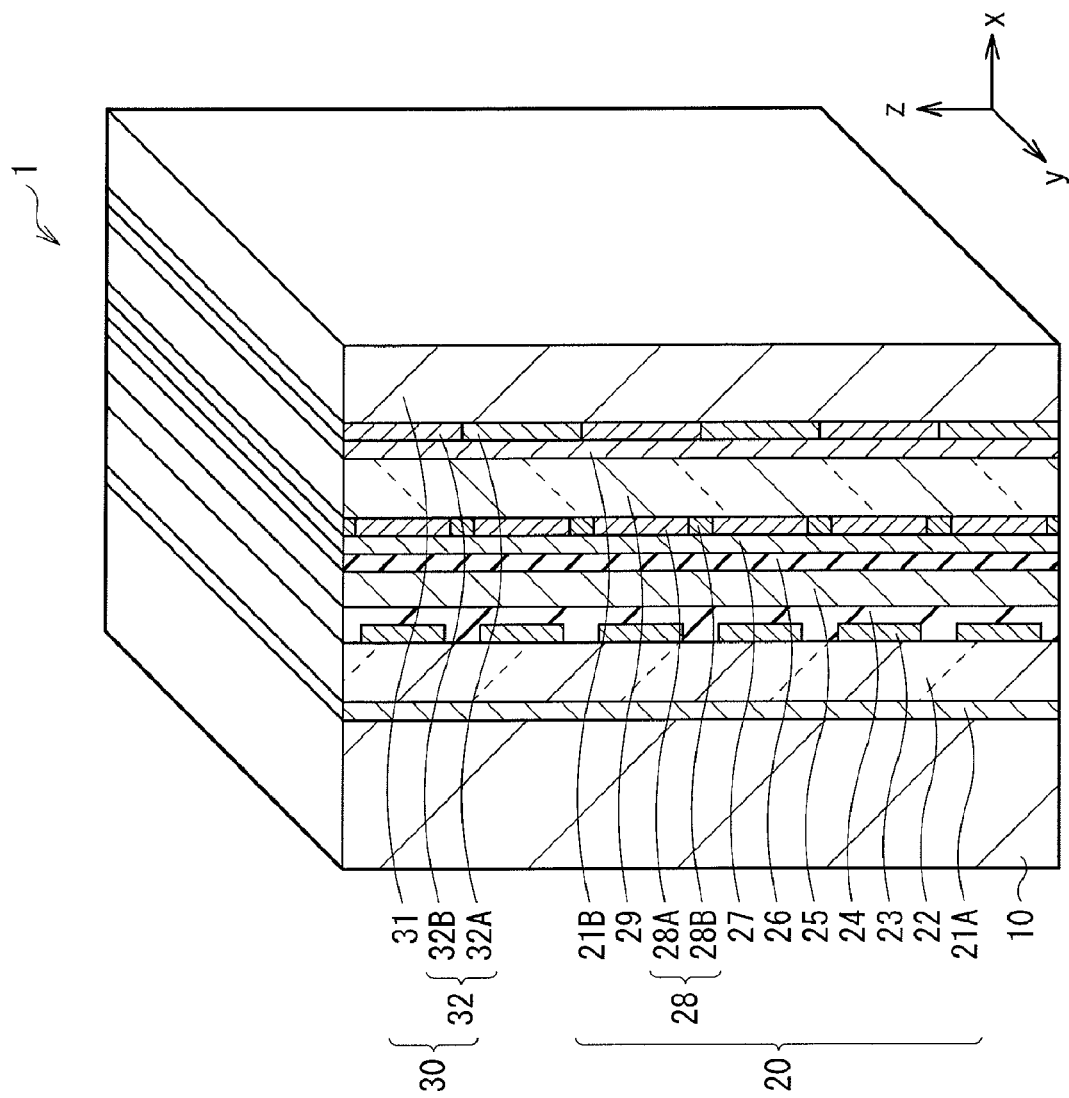
FIG. 1 is a cross sectional view illustrating an example of a configuration of a display unit according to an embodiment.

FIG. 1 illustrates a cross sectional configuration of a display unit according to an embodiment. A display unit 1 is a polarized glasses type display unit that displays a stereoscopic image for an observer (not illustrated) wearing after-mentioned polarized glasses 2 in front of eye balls. In the display unit 1, a backlight unit 10, a liquid crystal display panel 20 (display panel), and a phase difference device 30 are layered in this order. In the display unit 1, the phase difference device 30 is bonded to the light output side face of the liquid crystal display panel 20. The front face of the phase difference device 30 is an image display face, and is oriented to the observer side.

In this embodiment, the display unit 1 is arranged so that the image display face is in parallel with the vertical face (vertical plane). The image display face is in the shape of a rectangle, and the longitudinal direction of the image display face is in parallel with the horizontal direction (y-axis direction in the figure). The observer observes the image display face in a state of wearing the polarized glasses 2 in front of the eye balls. The polarized glasses 2 are, for example, circular polarized glasses. The display unit 1 is a display unit for, for example, circular polarized glasses.

Backlight Unit 10

The backlight unit 10 has, for example, a reflecting plate, a light source, and an optical sheet (not illustrated). The reflecting plate returns outputted light from the light source to the optical sheet side, and has functions such as reflection, scattering, and diffusion. The reflecting plate is made of, for example, foamed PET (polyethylene terephthalate) or the like. Thereby, outputted light from the light source is able to be used effectively. The light source illuminates the liquid crystal display panel 20 from behind. For example, in the light source, a plurality of linear light sources are arranged in parallel at even intervals, or a plurality of point light sources are two dimensionally arranged. Examples of the linear light source include a Hot Cathode Fluorescent Lamp (HCFL) and a Cold Cathode Fluorescent Lamp (CCFL). Examples of the point light sources include a Light Emitting Diode (LED). The optical sheet is intended to uniformize in-plane luminance distribution of light from the light source, or adjust a divergence angle and polarization state of light from the light source in a desired range. The optical sheet is composed of, for example, one or a plurality of members selected from the group consisting of a diffusion plate, a diffusion sheet, a prism sheet, a reflective polarization device, a phase difference plate and the like.

Liquid Crystal Display Panel 20

The liquid crystal display panel 20 is a transmissive display panel in which a plurality of pixels are two dimensionally arrayed in the row direction and in the column direction, and displays an image by driving each pixel according to a video signal. For example, as illustrated in FIG. 1, the liquid crystal display panel 20 has a polarization plate 21A, a transparent substrate 22, a pixel electrode 23, an alignment film 24, a liquid crystal layer 25, an alignment film 26, a common electrode 27, a color filter 28, a transparent substrate 29, and a polarization plate 21B sequentially from the backlight unit 10 side.

The polarization plate 21A is a polarization plate arranged on the light incident side of the liquid crystal display panel 20. The polarization plate 21B is a polarization plate arranged on the light output side of the liquid crystal display panel 20.

The polarization plates 21A and 21B are a kind of optical shutter, and transmits only light in a specific oscillation direction (polarized light). The polarization plates 21A and 21B are respectively arranged so that, for example, each polarization axis is different from each other by a given angle (for example, 90 degrees). Thereby, outputted light from the backlight unit 10 is transmitted through the liquid crystal layer or blocked.

Direction of a transmission axis (not illustrated) of the polarization plate 21A is set in a range in which light outputted from the backlight unit 10 is able to be transmitted. For example, in the case where a polarization axis of the light outputted from the backlight unit 10 is in the vertical direction, the transmission axis of the polarization plate 21A is also in the vertical direction. Further, for example, in the case where the polarization axis of the light outputted from the backlight unit 10 is in the horizontal direction, the transmission axis of the polarization plate 21A is also in the horizontal direction. The light outputted from the backlight unit 10 is not limited to linear polarized light, but may be circular polarized light, elliptic polarized light, or non-polarized light.

Direction of a polarization axis (not illustrated) of the polarization plate 21B is set in a range in which light transmitted through the liquid crystal display panel 20 is able to be transmitted. For example, in the case where the polarization axis of the polarization plate 21A is in the horizontal direction, the polarization axis of the polarization plate 21B is in the direction orthogonal to the polarization axis of the polarization plate 21A (vertical direction). In the case where the polarization axis of the polarization plate 21A is in the vertical direction, the polarization axis of the polarization plate 21B is in the direction orthogonal to the polarization axis of the polarization plate 21A (horizontal direction).

The transparent substrates 22 and 29 are generally a substrate transparent to visible light. In the transparent substrate on the backlight unit 10 side, for example, an active drive circuit including a TFT (Thin Film Transistor) as a drive device electrically connected to the transparent pixel electrode, a wiring and the like is formed. The plurality of pixel electrodes 23 are, for example, arranged in a matrix state in the plane of the transparent substrate 22. The pixel electrode 23 is composed of, for example, Indium Tin Oxide (ITO), and functions as an electrode for every pixel. The alignment films 24 and 26 are made of, for example, a polymer material such as polyimide, and perform alignment treatment for liquid crystal. The liquid crystal layer 25 is composed of Vertical Alignment (VA) mode/Twisted Nematic (TN) mode/Super Twisted Nematic (STN) mode liquid crystal. The liquid crystal layer 25 has a function to transmit or block outputted light from the backlight unit 10 for every pixel according to an applied voltage from a drive circuit (not illustrated). The common electrode 27 is composed of, for example, ITO, and functions as a common opposed electrode. In the color filter 28, filter sections 28A for providing outputted light from the backlight unit 10 with color separation into red (R), green (G), and blue (B) are arranged. In the color filter 28, the filter section 28A is provided with a black matrix section 28B having a light shielding function in a section corresponding to an interface between pixels.

Phase Difference Device 30

Figure 2:
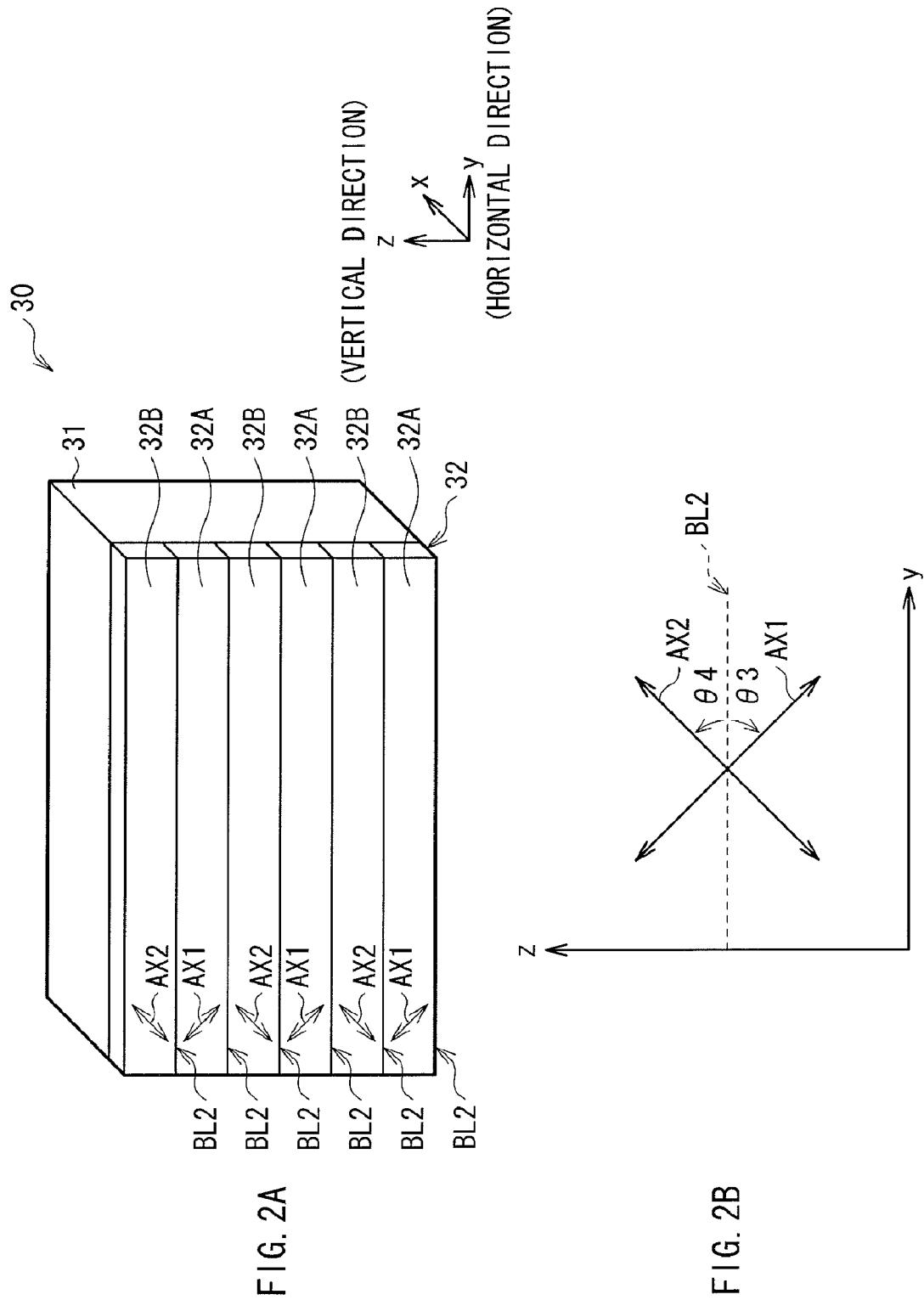
FIG. 2A is a perspective view illustrating an example of a structure of the phase difference device of FIG. 1.
FIG. 2B is a conceptual view illustrating an example of a slow axis of the phase difference device of FIG. 2A.

Next, a description will be given of the phase difference device 30. FIG. 2A is a perspective view of an example of a structure of the phase difference device 30 of this embodiment. FIG. 2B illustrates a slow axis of the phase difference device 30 of FIG. 2A.

The phase difference device 30 is intended to change polarization state of light transmitted through the polarization plate 21B of the liquid crystal display panel 20. For example, as illustrated in FIG. 1 and FIG. 2A, the phase difference device 30 has an alignment film 31 and a phase difference layer 32. The alignment film 31 has an alignment function for aligning liquid crystal or the like. For example, the alignment film 31 has a function for aligning a liquid crystal layer 46 described later (layer corresponding to a precursor of the phase difference layer 32) in a specific direction.

Figure 3:
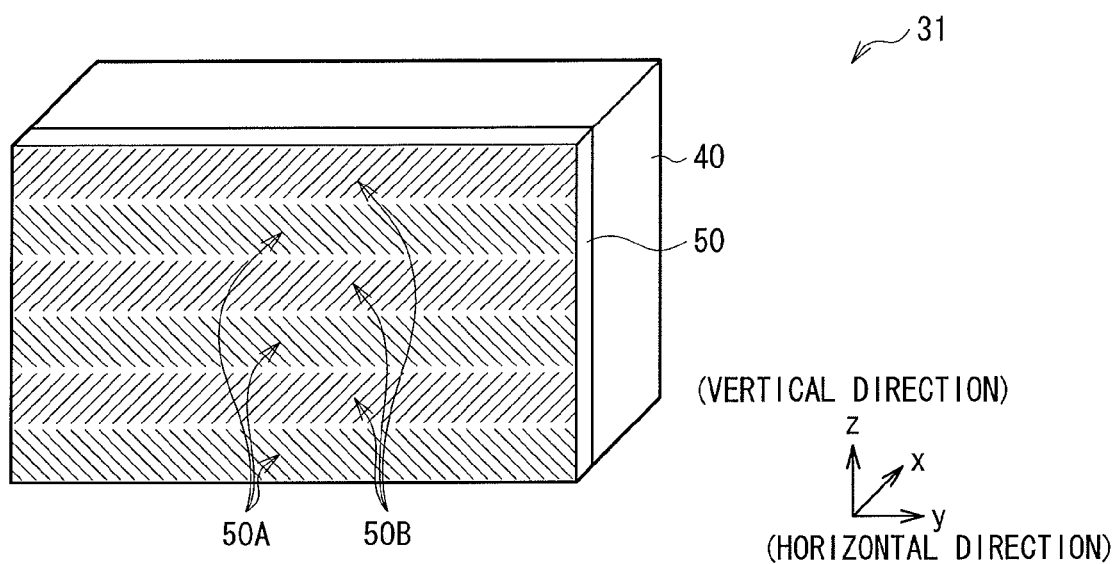
FIG. 3 is a perspective view illustrating an example of a structure of the alignment film of FIG. 2A.
Figure 5A:
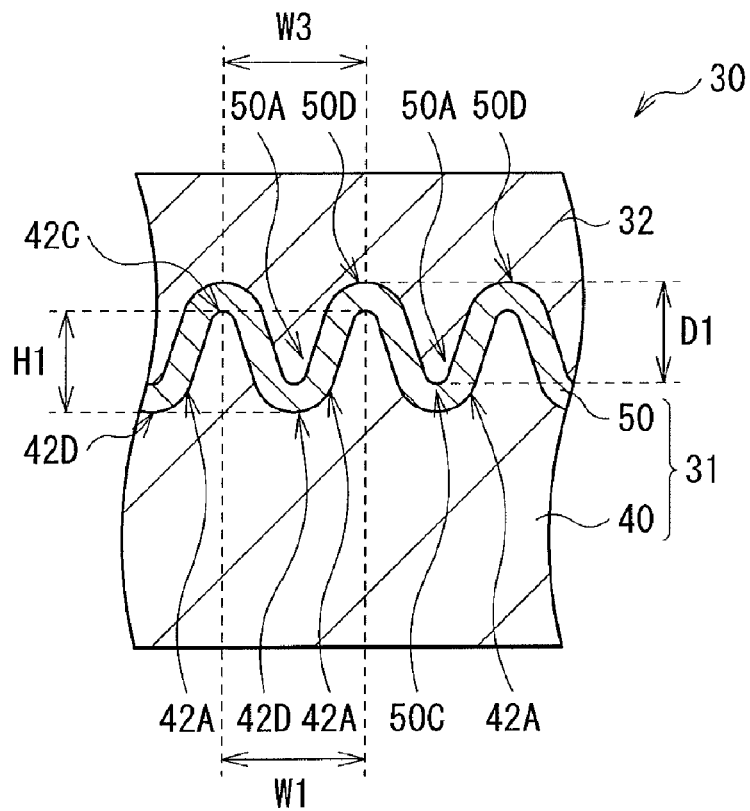
FIGS. 5A and 5B are cross sectional views illustrating an example of a structure of the phase difference device of FIG. 1.
Figure 5B:
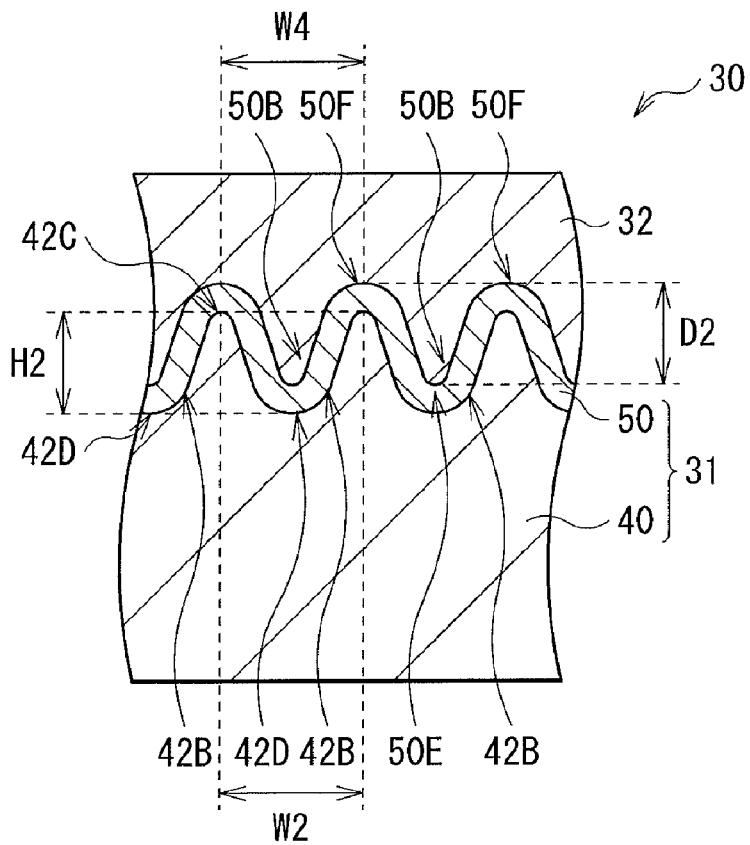

FIG. 3 is a perspective view of an example of a structure of the alignment film 31. FIG. 4A is a perspective view of an example of a structure of a substrate 40 described later. FIG. 4B illustrates an example of minute grooves 42A and 42B described later in the extending direction. FIGS. 5A and 5B illustrate an example of a cross sectional structure of the phase difference device 30 of FIG. 2A.

In other words, a thing obtained by providing a non-alignment thin film 50 on the substrate 40 is the alignment film 31 illustrated in FIG. 3, and a thing obtained by providing the phase difference layer 32 on the alignment film 31 is the phase difference device 30 illustrated in FIG. 2A.

FIG. 5A illustrates an example of a cross sectional structure of a section corresponding to a right-eye region 41A (described later) of the phase difference device 30. FIG. 5B illustrates an example of a cross sectional structure of a section corresponding to a left-eye region 41B (described later) of the phase difference device 30.

As illustrated in FIG. 3, the alignment film 31 has the substrate 40 and the non-alignment thin film 50. The substrate 40 is made of, for example, a transparent resin film. As the transparent resin film, a film having small optical anisotropy, that is, a small birefringence is preferably used. Examples of such a transparent resin film include COP (cycloolefin polymer), Zeonor (registered trademark) or Zeonex (registered trademark) made by Zeon Corporation, Arton (registered trademark) made by JSR Corporation, and TAC (triacetylcellulose). TAC is relatively inexpensive, but has a relatively high humidity expansion coefficient and has characteristics of being easily shrunk or expanded. The substrate 40 may have a single layer structure, or may have a laminated structure composed of an outermost layer in which the after-mentioned minute grooves 42A and 42B are formed and a layer supporting the outermost layer. In the latter case, the layer supporting the outermost layer may be formed from, for example, TAC, and the outermost layer may be formed from a UV curing resin.

As illustrated in FIG. 4A, the substrate 40 has the right-eye region 41A (first groove region) and the left-eye region 41B (second groove region). The right-eye region 41A and the left-eye region 41B have a strip shape extending in a common one direction (horizontal direction). The right-eye region 41A and the left-eye region 41B are regularly arranged adjacently to each other in the in-plane direction of the substrate 40. Specifically, the right-eye region 41A and the left-eye region 41B are arranged alternately in the short direction (vertical direction) of the right-eye region 41A and the left-eye region 41B. Thus, a boundary BL1 where the right-eye region 41A and the left-eye region 41B are adjacent to (contacted with) each other is in the same direction as the longitudinal direction (horizontal direction) of the right-eye region 41A and the left-eye region 41B. Further, the right-eye region 41A and the left-eye region 41B are arranged correspondingly to arrangement of the plurality of pixel electrodes 23.

As illustrated in FIGS. 4A and 4B, the right-eye region 41A includes the plurality of minute grooves 42A (first groove) extending in direction G1 (first direction) intersecting with the boundary BL1 at angle θ1 other than being orthogonal to the boundary BL1. Meanwhile, as illustrated in FIGS. 4A and 4B, the left-eye region 41B includes the plurality of minute grooves 42B (second groove) extending in direction G2 (second direction) that is a direction intersecting with the boundary BL1 at angle θ2 other than being orthogonal to the boundary BL1 and that is a direction different from the extending direction of the minute grooves 42A. The extending direction of the minute grooves 42A is orthogonal to the extending direction of the minute grooves 42B. For example, θ1 is −45 degrees (45 degrees in the clockwise direction based on the boundary BL1), and θ2 is +45 degrees (45 degrees in the counterclockwise direction based on the boundary BL1).

Aperture width W1 of the respective minute grooves 42A (pitch of the plurality of minute grooves 42A) (FIG. 5A) is, for example, 2 μm or less. In the case where the pitch of the plurality of minute grooves 42A is 2 μm or less, in forming the non-alignment thin film 50 on the plurality of minute grooves 42A in the course of manufacturing, a liquid crystal layer 46 (described later) is able to be easily aligned thereon. Aperture width W2 of the respective minute grooves 42B (pitch of the plurality of minute grooves 42B) (FIG. 5B) is, for example, 2 μm or less. In the case where the pitch of the plurality of minute grooves 42B is 2 μm or less, in forming the non-alignment thin film 50 on the plurality of minute grooves 42B in the course of manufacturing, the liquid crystal layer 46 (described later) is able to be easily aligned thereon. Heights H1 and H2 of a stripe-shaped mountain adjacent to the respective minute grooves 42A and 42B are, for example, about several hundred nm. The heights H1 and H2 are a length of a segment that is extended in the normal line direction of the substrate 40 from an apex section 42C of the stripe-shaped mountain adjacent to the minute grooves 42A and 42B to a bottom face section 42D of the minute groove 42A or the minute groove 42B located on both sides of the apex section 42C.

The non-alignment thin film 50 is a thin film in which lots of molecules located on the surface of the non-alignment thin film 50 do not have alignment characteristics, that is, are in each random direction. The non-alignment thin film 50 reduces influence of molecular alignment of the surface of the substrate 40 as a base (in particular, the surface of the minute grooves 42A and 42B) on the phase difference layer 32. The non-alignment thin film 50 is made of, for example, a UV curing resin. Examples of UV curing resin include a UV curing acryl resin. In the case where the non-alignment thin film 50 is formed by curing the UV curing acryl resin, an uncured UV curing acryl resin as a raw material of the non-alignment thin film 50 preferably has three or more functional groups.

The non-alignment thin film 50 may be made of the same material as that of the substrate 40, or may be made of a material different from that of the substrate 40. As will be described later, the non-alignment thin film 50 is formed in a step different from that of the substrate 40. Thus, even if the non-alignment thin film 50 is made of the same material as that of the substrate 40, a boundary exists between the non-alignment thin film 50 and the substrate 40. That is, it is possible to check existence of the non-alignment thin film 50 in analyzing a cross section of the phase difference device 30. The non-alignment thin film 50 is formed by a method with which alignment characteristics are not generated in molecules such as coating and sputtering. The non-alignment thin film 50 is formed along the surface of the plurality of minute grooves 42A and 42B, and has an approximately uniform thickness. The thickness of the non-alignment thin film 50 is preferably 20 nm or more in terms of eliminating influence of molecular alignment of a base. The upper limit of the thickness of the non-alignment thin film 50 is preferably a thickness with which dents 50A and 50B described later are not eliminated.

For example, as illustrated in FIGS. 5A and 5B, the non-alignment thin film 50 is formed along the surface of the plurality of minute grooves 42A and 42B, and undulates correspondingly to concavity and convexity formed by the plurality of minute grooves 42A and 42B. The non-alignment thin film 50 has the dent 50A directly above the plurality of minute grooves 42A, and the dent 50B directly above the plurality of minute grooves 42B. The plurality of dents 50A formed by the non-alignment thin film 50 extend in the extending direction of the minute groove 42A, and the plurality of dents 50B formed by the non-alignment thin film 50 extend in the extending direction of the minute groove 42B. The extending direction of the dent 50A and the extending direction of the dent 50B are, for example, orthogonal to each other. For example, the dent 50A (corresponding to the minute grove 42A) extends in the direction (angle θ1) rotated by 45 degrees in the clockwise direction based on the boundary BL1, and the dent 50B (corresponding to the minute grove 42B) extends in the direction (angle θ21) rotated by 45 degrees in the counterclockwise direction based on the boundary BL1 (refer to FIGS. 4A and 4B).

The respective dents 50A have an alignment function for aligning liquid crystal or the like by the shape thereof (in particular, an edge part of the respective dents 50A). Aperture width W3 of the respective dents 50A (pitch of the plurality of dents 50A) is, for example, 2 μm or less. In the case where the pitch of the plurality of dents 50A is 2 μm or less, in forming the liquid crystal layer 46 (described later) on the plurality of dents 50A is formed in the course of manufacturing, liquid crystal molecules in the liquid crystal layer 46 are able to be easily aligned. The pitch of the plurality of dents 50A is, for example, 2 μm or less, and is preferably 1 μm or less. In particular, in the case where the pitch of the plurality of dents 50A is 1 μm or less, for example, a higher order parameter than the order parameter of the alignment film formed by SiO oblique evaporation method as an existing technique is able to be obtained.

Depth D1 of the respective dents 50A is preferably from 30 nm to 1 μm both inclusive. The depth D1 is a length of a segment that is extended in the normal line direction of the substrate 40 from a bottom section 50C of the dent 50A to an apex section 50D of stripe-shaped mountains sandwiching the dent 50A from both sides. In the case where the depth D1 is less than 10 nm, liquid crystal molecules in the liquid crystal layer 46 are hardly aligned appropriately. Meanwhile, in the case where the depth D1 exceeds 1 μm, liquid crystal alignment tends to be disturbed at an edge of the respective dents 50A.

The respective dents 50B also have an alignment function for aligning liquid crystal or the like by the shape thereof (in particular, an edge part of the respective dents 50B) as the respective dents 50A do. Aperture width W4 of the respective dents 50B (pitch of the plurality of dents 50B) is, for example, 2 μm or less. In the case where the pitch of the plurality of dents 50B is 2 μm or less, in forming the liquid crystal layer 46 (described later) on the plurality of dents 50B in the course of manufacturing, liquid crystal molecules in the liquid crystal layer 46 are able to be easily aligned. The pitch of the plurality of dents 50B is preferably 1 μm or less. In the case where the pitch of the plurality of dents 50A is 1 μm or less, for example, a higher order parameter than the order parameter of the alignment film formed by SiO oblique evaporation method as an existing technique is able to be obtained.

Depth D2 of the respective dents 50B is preferably from 30 nm to 1 μm both inclusive. The depth D2 is a length of a segment that is extended in the normal line direction of the substrate 40 from a bottom section 50E of the dent 50B to an apex section 50F of stripe-shaped mountains sandwiching the dent 50B from both sides. In the case where the depth D2 is less than 10 nm, liquid crystal molecules in the liquid crystal layer 46 are hardly aligned appropriately. Meanwhile, in the case where the depth D2 exceeds 1 μm, liquid crystal alignment tends to be disturbed at an edge of the respective dents 50B.

The phase difference layer 32 is a thin layer having optical anisotropy. The phase difference layer 32 is provided on the surface of the alignment film 31 (non-alignment thin film 50), and is bonded to the surface on the light output side of the liquid crystal display panel 20 (polarization plate 21B). The phase difference layer 32 is formed by arranging a solution including a liquid crystalline monomer on the surface of the alignment film 31 (non-alignment thin film 50), aligning the liquid crystalline monomer, and polymerizing the aligned liquid crystalline monomer. The phase difference layer 32 has two types of phase difference regions (right-eye region 32A and left-eye region 32B) having a direction of each slow axis different from each other.

For example, as illustrated in FIG. 1 and FIG. 2A, the right-eye region 32A and the left-eye region 32B have a strip shape extending in a common one direction (horizontal direction). The right-eye region 32A and the left-eye region 32B are regularly arranged adjacently to each other in the in-plane direction of the alignment film 31. Specifically, the right-eye region 32A and the left-eye region 32B are arranged alternately in the short direction (vertical direction) of the right-eye region 32A and the left-eye region 32B. The right-eye region 32A of the phase difference layer 32 is arranged directly above the right-eye region 41A (first groove region) illustrated in FIG. 4A, and the left-eye region 32B of the phase difference layer 32 is arranged directly above the left-eye region 41B (second groove region) illustrated in FIG. 4A. Thus, a boundary BL2 where the right-eye region 32A and the left-eye region 32B of the phase difference layer 32 are adjacent to (contacted with) each other is in the same direction as the boundary BL1 separating the right-eye region 41A from the left-eye region 41B (see FIG. 2A and FIG. 4A). Further, the right-eye region 32A and the left-eye region 32B of the phase difference layer 32 are arranged correspondingly to arrangement of the plurality of pixel electrodes 23.

As illustrated in FIGS. 2A and 2B, the right-eye region 32A of the phase difference layer 32 has a slow axis AX1 in the direction intersecting with the boundary BL2 at angle θ3 other than being orthogonal to the boundary BL2. The slow axis AX1 is in the direction in parallel with the extending direction of the plurality of minute grooves 42A illustrated in FIG. 4A (dent 50A formed by the non-alignment thin film 50) or in the direction crossing with the extending direction of the plurality of minute grooves 42A at a predetermined angle. Meanwhile, as illustrated in FIGS. 2A and 2B, the left-eye region 32B of the phase difference layer 32 has a slow axis AX2 in the direction crossing with the boundary BL2 at angle θ4 other than being orthogonal to the boundary BL2 and that is a direction different from the direction of the slow axis AX1. The slow axis AX2 is in the direction in parallel with the extending direction of the plurality of minute grooves 42B illustrated in FIG. 4A (dent 50B formed by the non-alignment thin film 50) or in the direction crossing with the extending direction of the plurality of minute grooves 42B at a predetermined angle. The slow axis AX1 is, for example, orthogonal to the slow axis AX2. For example, θ3 is −45 degrees (45 degrees in the clockwise direction based on the boundary BL2), and θ4 is +45 degrees (45 degrees in the counterclockwise direction based on the boundary BL2).

"Direction different from the direction of the slow axis AX1" does not simply means that the slow axis AX2 is in the direction different from the direction of the slow axis AX1, but means the slow axis AX2 is rotated in the opposite direction of the direction of the slow axis AX1 in relation to the boundary BL2. In other words, the slow axes AX1 and AX2 are rotated in the direction different from each other with the boundary BL2 in between. The angle θ3 of the slow axis AX1 is preferably equal to the angle θ4 of the slow axis AX2 as an absolute value (in the case of not considering the rotation direction). However, a slight difference according to manufacturing error (manufacturing tolerance) or the like is allowable.

As illustrated in FIGS. 2A and 2B, the slow axes AX1 and AX2 are in the direction crossing with both the horizontal direction and the vertical direction. Further, the slow axes AX1 and AX2 are preferably in the direction so that the bisector of an angle made by the slow axes AX1 and AX2 (angle in the horizontal direction in FIG. 2B) is in parallel with the boundary BL2.

As illustrated in FIGS. 6A and 6B, the slow axes AX1 and AX2 are in the direction crossing with polarization axis AX4 of the polarization plate 21B of the liquid crystal display panel 20. Further, the slow axis AX1 is in the same direction as the direction of the slow axis AX5 of a right-eye phase difference film 61B of the polarized glasses 2 described later or in the direction corresponding to the direction thereof, and is in the direction different from the direction of a slow axis AX6 of a left-eye phase difference film 62B of the polarized glasses 2. Meanwhile, the slow axis AX2 is in the same direction as the direction of the slow axis AX6 or in the direction corresponding to the direction of the slow axis AX6, and is in the direction different from the direction of the slow axis AX5.

Polarized Glasses 2

Figure 7:
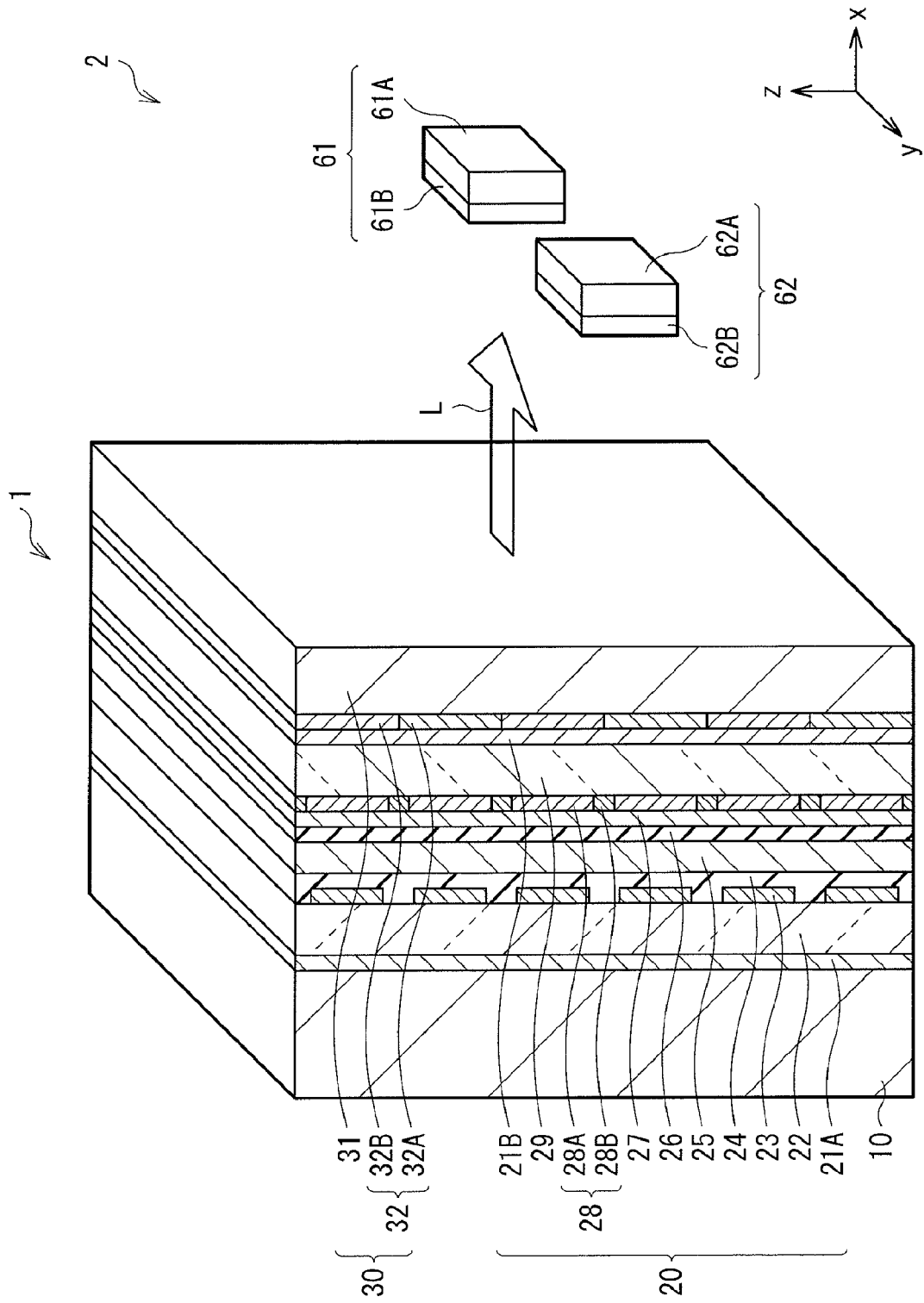
FIG. 7 is a system view illustrating a relation between the display unit of FIG. 1 and polarized glasses.

Next, a description will be given of the polarized glasses 2. FIG. 7 is a perspective view of an example of a structure of the polarized glasses 2 together with the display unit 1. The polarized glasses 2 are set in front of eye balls of an observer (not illustrated). The polarized glasses 2 are used by the observer in observing a video displayed on the image display face. For example, as illustrated in FIG. 7, the polarized glasses 2 have a right-eye glass 61 and a left-eye glass 62.

The right-eye glass 61 and the left-eye glass 62 are arranged to face the image display face of the display unit 1. As illustrated in FIG. 7, the right-eye glass 61 and the left-eye glass 62 are preferably arranged in one horizontal face as long as possible, but may be arranged in a slightly tilted flat face.

The right-eye glass 61 selectively transmits right-eye image light L2 in image light L outputted from the display unit 1, and has, for example, a polarization plate 61A and a right-eye phase difference film 61B. Meanwhile, the left-eye glass 62 selectively transmits left-eye image light L3 in image light L outputted from the display unit 1, and has, for example, a polarization plate 62A and a left-eye phase difference film 62B. The right-eye phase difference film 61B is provided in the place that is the surface of the polarization plate 61A and that is the light incident side. The left-eye phase difference film 62B is provided in the place that is the surface of the polarization plate 62A and the light incident side.

Figure 8:
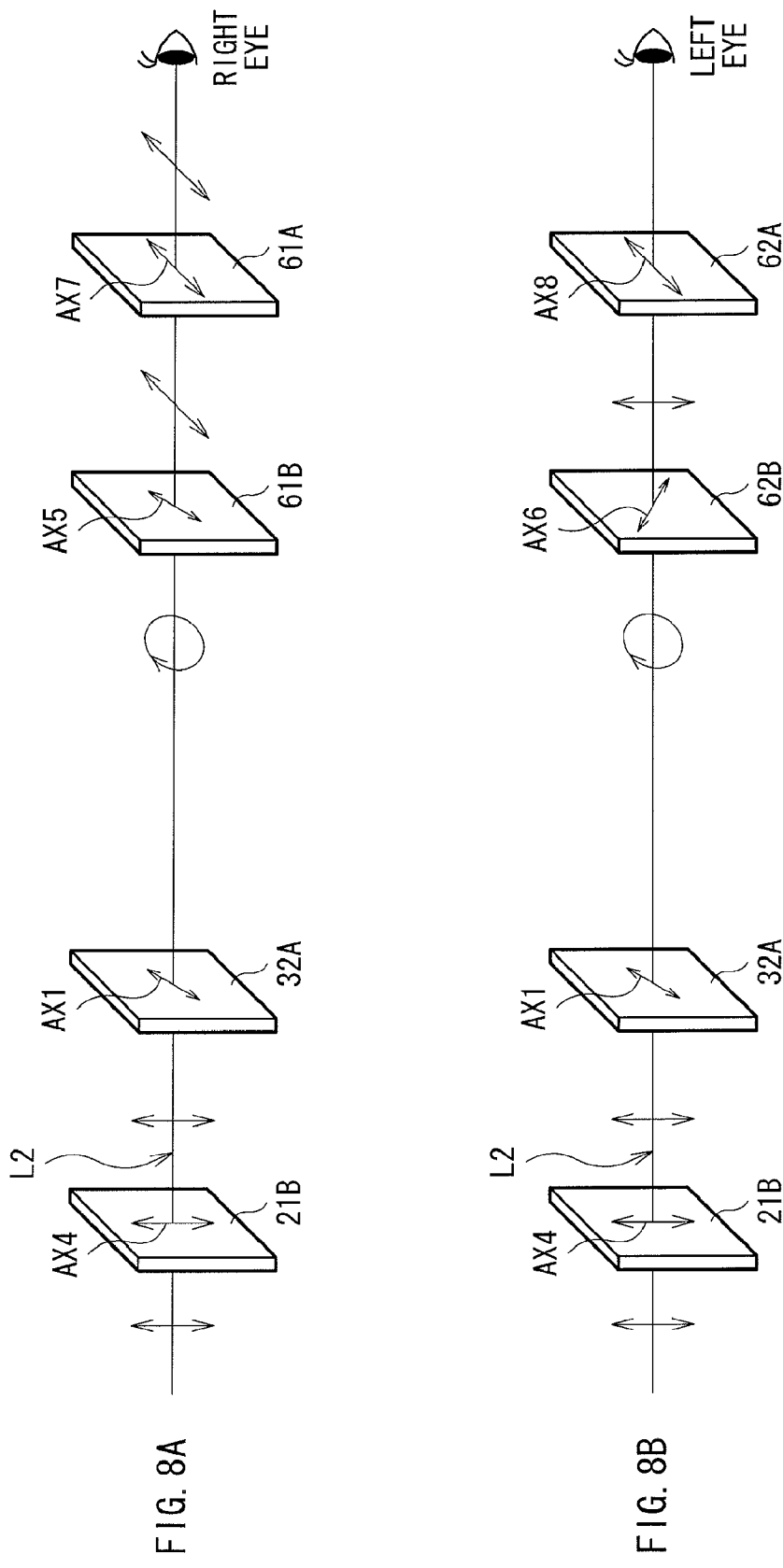
FIGS. 8A and 8B are conceptual views for explaining an example of a transmission axis and a slow axis in observing a video of the display unit of FIG. 1 through a right eye.
Figure 9:
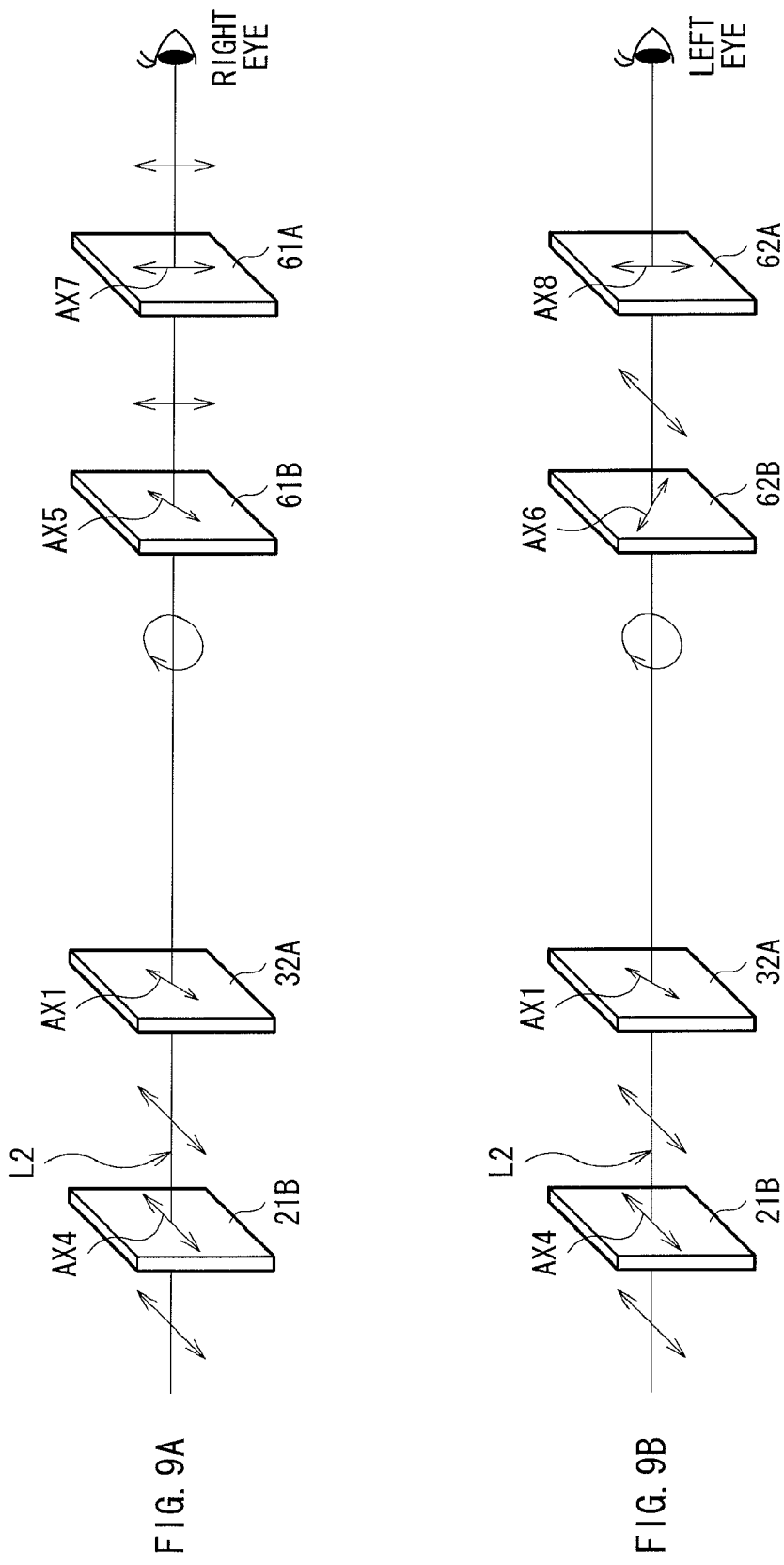
FIGS. 9A and 9B are conceptual views for explaining another example of a transmission axis and a slow axis in observing the video of the display unit of FIG. 1 through the right eye.
Figure 10:
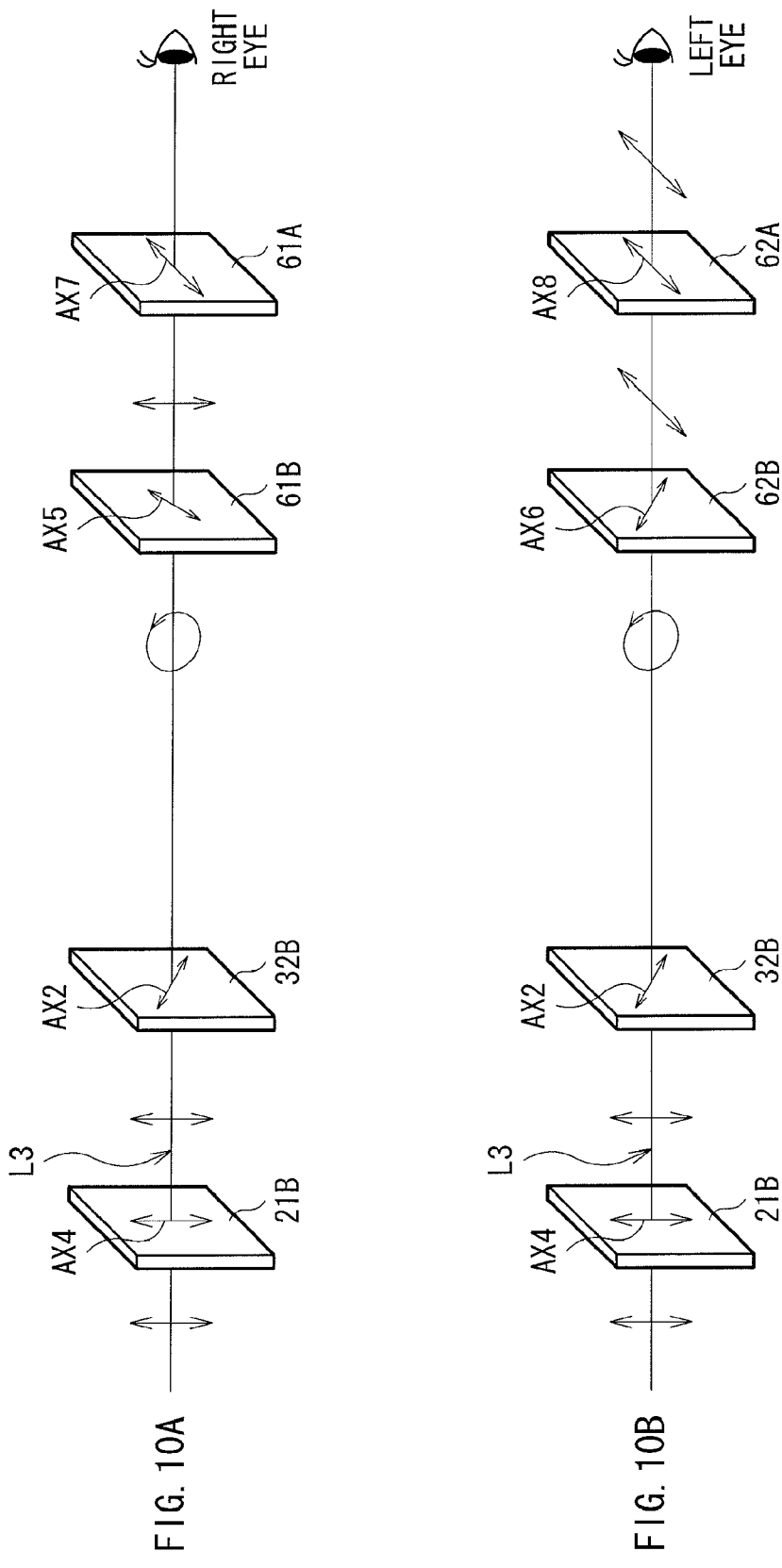
FIGS. 10A and 10B are conceptual views for explaining an example of a transmission axis and a slow axis in observing the video of the display unit of FIG. 1 through a left eye.
Figure 11:
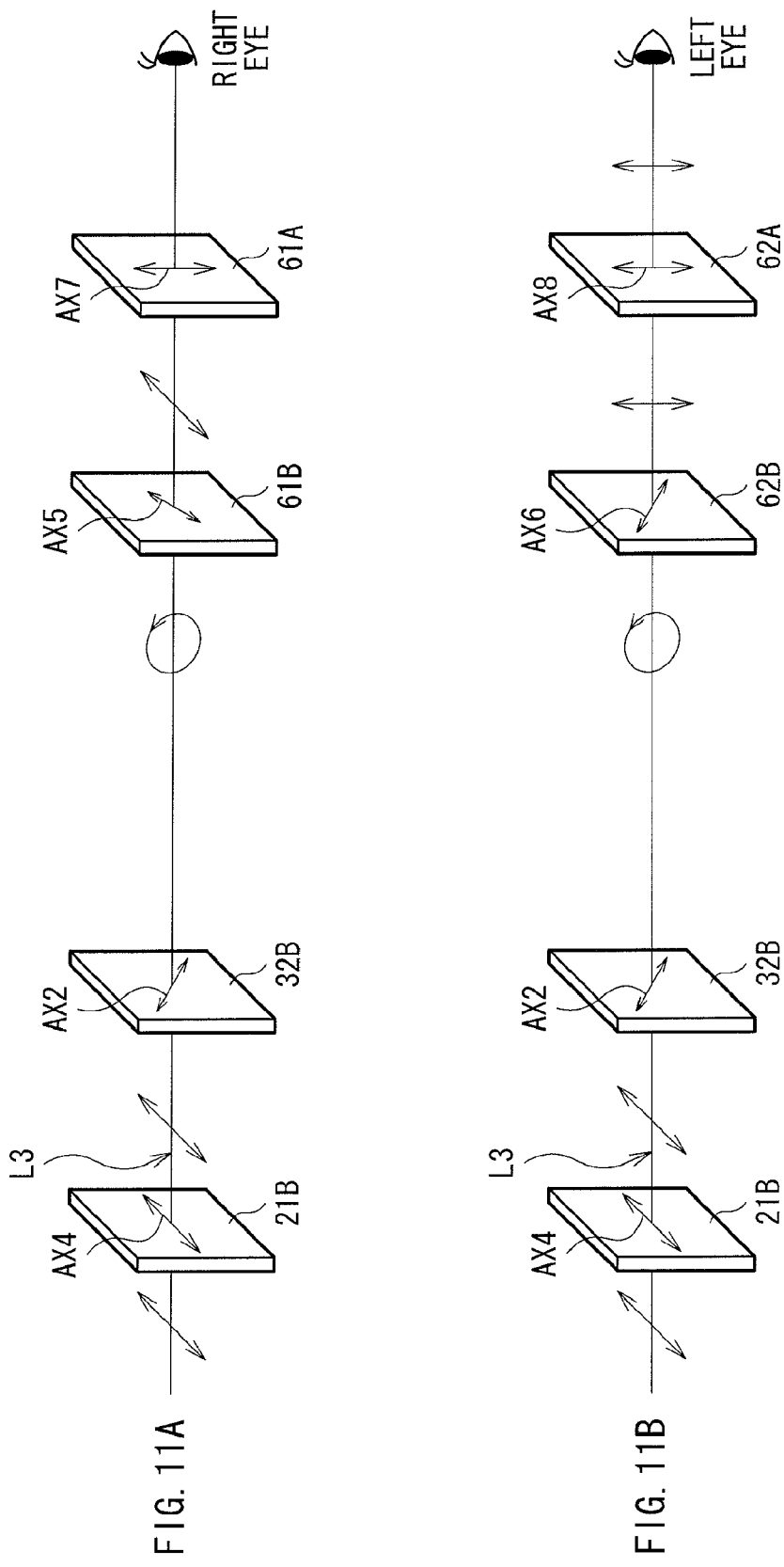
FIGS. 11A and 11B are conceptual views for explaining another example of a transmission axis and a slow axis in observing the video of the display unit of FIG. 1 through the left eye.

The polarization plates 61A and 62A are arranged on the light output side of the light L in the polarized glasses 2, and transmits only light (polarized light) in a specific oscillation direction. Polarization axes AX7 and AX8 of the polarization plates 61A and 62A are respectively in the direction orthogonal to the polarization axis AX4 of the polarization plate 21B in the display unit 1 (FIGS. 8A and 8B). For example, as illustrated in FIGS. 8A and 8B, the polarization axes AX7 and AX8 are respectively in the horizontal direction in the case where the polarization axis AX4 is in the vertical direction. Meanwhile, the polarization axes AX7 and AX8 are respectively in the vertical direction in the case where the polarization axis AX4 is in the horizontal direction.

The right-eye phase difference film 61B and the left-eye phase difference film 62B are a thin layer having optical anisotropy. As illustrated in FIGS. 8A and 8B, the slow axis AX5 of the right-eye phase difference film 61B and the slow axis AX6 of the left-eye phase difference film 62B are in the direction crossing with both the horizontal direction and the vertical direction, and are in the direction crossing with the polarization axes AX7 and AX8 of the polarization plates 61A and 62A. Further, the slow axes AX5 and AX6 are preferably in the direction so that the bisector in the horizontal direction of an angle made by the slow axes AX5 and AX6 is in the direction orthogonal to the boundary BL2 (see FIG. 2B). Further, the slow axis AX5 is in the same direction as the direction of the slow axis AX1 or in the direction corresponding to the direction of the slow axis AX1, and is in the direction different from the direction of the slow axis AX2. Meanwhile, the slow axis AX6 is in the same direction as the direction of the slow axis AX2 or in the direction corresponding to the direction of the slow axis AX2, and is in the direction different from the direction of the slow axis AX1 (see FIGS. 6A, 6B, 8A, and 8B).

Retardation

In the case where observation is made by using the polarized glasses 2, for example, as illustrated in FIGS. 8A, 8B, 9A, and 9B, it is necessary that a right eye is able to recognize an image of the right-eye pixel, and a left eye is not able to recognize the image of the right-eye pixel. Further, concurrently, for example, as illustrated in FIGS. 10A, 10B, 11A, and 11B, it is necessary that a left eye is able to recognize an image of a left-eye pixel, and a right eye is not able to recognize the image of the left-eye pixel. To this end, as illustrated below, it is preferable to set retardation of the right-eye region 32A of the phase difference layer 32 and the right-eye phase difference film 61B of the polarized glasses 2 and retardation of the left-eye region 32B of the phase difference layer 32 and the left-eye phase difference film 62B of the polarized glasses 2.

Specifically, it is preferable that one of the retardation of the right-eye region 32A and the retardation of the left-eye region 32B is $+\lambda/4$, and the other is $-\lambda/4$. The fact that each retardation sign is opposite means that each direction of each slow axis is different by 90 degrees. It is preferable that the retardation of the right-eye phase difference film 61B is identical with the retardation of the right-eye region 32A, and it is preferable that the retardation of the left-eye phase difference film 62B is identical with the retardation of the left-eye region 32B.

Method of Manufacturing the Phase Difference Device 30

Next, a description will be given of an example of a method of manufacturing the phase difference device 30. A description will be given of a case that a platy master is used in manufacturing the alignment film 31 included in the phase difference device 30 and a case that a roll-like master is used in manufacturing the alignment film 31 included in the phase difference device 30.

Case that a Platy Master is Used

Figure 12:
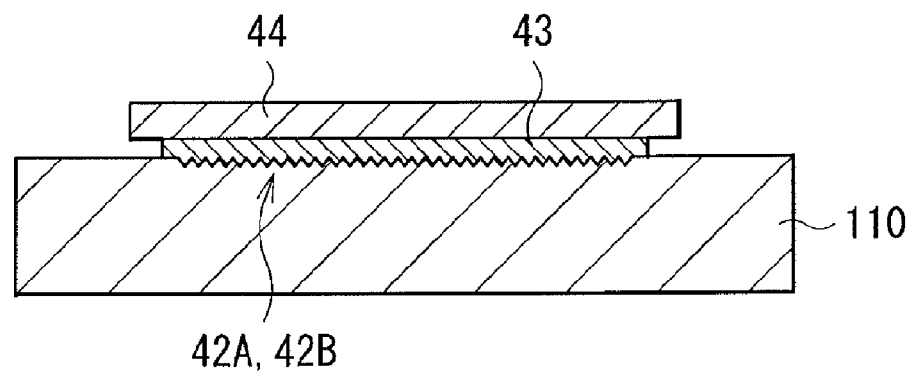
FIG. 12 is a schematic view for explaining an example of a method of manufacturing the phase difference device of FIG. 2A.
Figure 13:
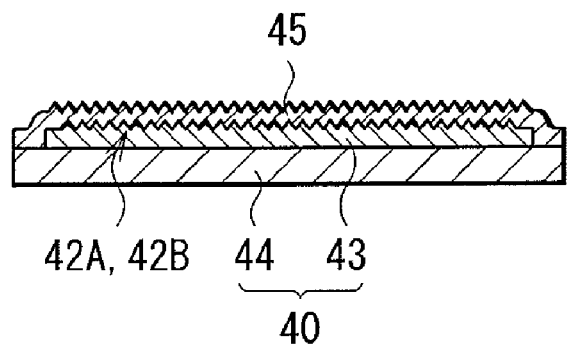
FIG. 13 is a schematic view for explaining a step following FIG. 12.

FIG. 12 and FIG. 13 illustrate a course of manufacturing the alignment film 31 with the use of a platy master. First, the substrate 40 is formed. For example, a UV curing resin layer 43 including a UV curing acryl resin liquid is arranged on the surface of a platy master 110 in which a reversal pattern of the plurality of minute grooves 42A and the plurality of minute grooves 42B is formed as illustrated in FIG. 4A. After that, the UV curing resin layer 43 is sealed with a base material film 44 composed of, for example, TAC (FIG. 12). Next, though not illustrated, the UV curing resin layer 43 is irradiated with ultraviolet to cure the UV curing resin layer 43. After that, the master 110 is separated. Thereby, the substrate 40 is formed (FIG. 13).

Next, a UV curing resin layer 45 including, for example, a UV curing acryl resin liquid is arranged on the surface on the side of the plurality of minute grooves 42A and the plurality of minute grooves 42B of the substrate 40 by coating or sputtering (FIG. 13). The UV curing resin layer 45 may be made of the same material as that of the UV curing resin layer 43, or may be made of a material different from that of the UV curing resin layer 43. Subsequently, though not illustrated, the UV curing resin layer 45 is irradiated with ultraviolet to cure the UV curing resin layer 45.

Figure 14:
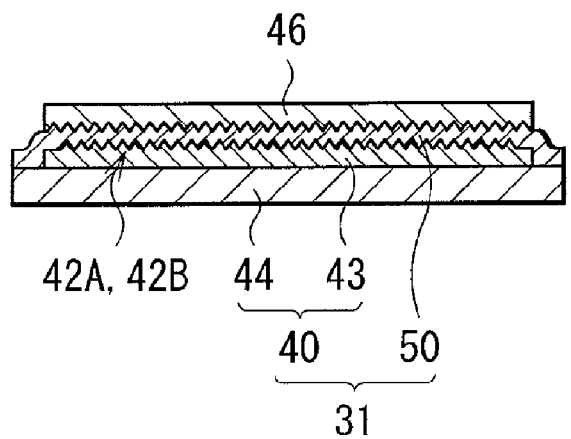
FIG. 14 is a schematic view for explaining a step following FIG. 13.

For example, the surface on the side of the plurality of minute grooves 42A and the plurality of minute grooves 42B of the substrate 40 is coated with a UV curing acryl resin liquid (or a mixed solution including the same) by hand with the use of a bar coater (No. 2, 3, 4, or 5) to form a film. Subsequently, the formed layer made of the UV curing acryl resin liquid (or the mixed solution including the same) is dried for 30 seconds in an oven at 80 deg C., for example. After that, the resultant is cured by UV irradiation under, for example, intensity about 1000 mJ/cm². Thereby, the non-alignment thin film 50 is formed along the surface of the plurality of minute grooves 42A and 42B. Accordingly, the alignment film 31 is formed (FIG. 14).

As the UV curing resin layer 45, a UV cured acryl resin having three or more functional groups is preferably used. For example, the resins shown in Examples 1 to 4 of Table 1 are preferably used. In the case where a material having the small number of functional groups as shown in Comparative examples 1 to 4 of Table 1 is used, contact characteristics are not favorable much, and there is often the case that the non-alignment thin film 50 is separated from the substrate 40. Meanwhile, in the case where a material having the large number of functional groups (3 or more) as shown in Examples 1 to 4 of Table 1 is used, contact characteristics are favorable, and the non-alignment thin film 50 is not separated from the substrate 40. However, in the case where a material having the large number of functional groups (5 or more) as shown in Example 4 of Table 1 is used, viscosity is significantly high, and dimension change due to curing (curl) is large. Thus, by using a material having the number of functional groups of 3 or 4 out of the UV curing acryl resin as the UV curing resin layer 45, favorable results for both contact characteristics and dimension change are obtainable.

TABLE 1

|  | UV curing resin | Number of functional groups | Contact characteristics | Dimension change |
|---|---|---|---|---|
| Comparative example 1 | BD-PTR1 | 2 | poor | good |
| Comparative example 2 | TB3042 | 1 | poor | good |
| Comparative example 3 | TB3017D | 1 | poor | good |
| Comparative example 4 | 1,3-butylene glycol diacrylate SR212 | 2 | average | good |
| Example 1 | Pentaerythritol triacrylate M-305 | 3, 4 | good | good |
| Example 2 | Pentaerythritol triacrylate M-306 | 3, 4 | good | good |
| Example 3 | Pentaerythritol tetraacrylate M-451 | 4 | good | good |
| Example 4 | Polyacid modified acryl oligomer M510 | 5 | good | average |

The case affixed with "good" for the contact characteristics in Table 1 means that no separation was shown out of 100 crosshatch tape peel tests. The case affixed with "average" for the contact characteristics in Table 1 means that the number of no separation was from 20 to less than 100 out of 100 crosshatch tape peel tests. The case affixed with "poor" for the contact characteristics in Table 1 means that the number of no separation was less than 20 out of 100 crosshatch tape peel tests. Further, the case affixed with "good" for the dimension change in Table 1 means that all dimension change amounts (curl amount) in curl amount measurement tests were in an allowable range. The case affixed with "average" for the dimension change in Table 1 means that the number of dimension change amounts (curl amount) in the allowable range was from 20 to less than 100 out of 100 curl amount measurement tests.

FIG. 14 illustrates a course of manufacturing the phase difference device 30 by using the alignment film 31 formed as above. The surface on the non-alignment thin film 50 side of the alignment film 31 is coated with the liquid crystal layer 46 including a liquid crystalline monomer by, for example, a roll coater or the like. At this time, for the liquid crystal layer 46, a solvent for dissolving the liquid crystalline monomer, a polymer initiator, a polymer inhibitor, an interface active agent, a leveling agent and the like are able to be used according to needs. The solvent is not particularly limited, but a solvent that highly dissolves the liquid crystalline monomer, has low steam pressure at room temperature, and is less likely to be vaporized at room temperature is preferably used. Examples of solvents that are less likely to be vaporized at room temperature include 1-methoxy-2-acetoxypropane (PGMEA), toluene, methylethylkeotne (MEK), and methylisobutylketone (MIBK). If a solvent that is easily vaporized at room temperature is used, vapor rate of the solvent after coating formation of the liquid crystal layer 46 is excessively high, and thus alignment of the liquid crystalline monomer formed after vaporization of the solvent is easily disturbed.

Subsequently, though not illustrated, alignment treatment (heating treatment) of the liquid crystalline monomer of the liquid crystal layer 46 with which the surface of the alignment film 31 is coated is provided. The heating treatment is performed at temperature that is equal to or higher than phase transition temperature of the liquid crystalline monomer. In particular, in the case of using a solvent, the heating treatment is performed at temperature that is equal to or higher than temperature at which the solvent is dried. In some cases, by coating the liquid crystalline monomer in the previous step, shear stress is applied to the interface between the liquid crystalline monomer and the alignment film 31, alignment due to flow (flowage alignment) and alignment due to force (external force alignment) are generated, and accordingly liquid crystal molecules are aligned in unintentional direction. The foregoing heating treatment is performed for once cancelling the alignment state of the liquid crystalline monomer that has been aligned in such an unintentional direction. Thereby, in the liquid crystal layer 46, the solvent is dried, only the liquid crystalline monomer is left, and the state becomes isotropic phase.

After that, though not illustrated, the liquid crystal layer 46 is cooled down to temperature slightly lower than the phase transition temperature. Thereby, the liquid crystalline monomer is aligned according to pattern of the plurality of minute grooves 42A and the plurality of minute grooves 42B formed on the surface of the alignment film 31. That is, the liquid crystalline monomer is aligned along the extending direction of the plurality of minute grooves 42A and the plurality of minute grooves 42B.

Subsequently, though not illustrated, the liquid crystal layer 46 after alignment treatment is irradiated with, for example, UV light, and thereby the liquid crystalline monomer is polymerized. At this time, it is often the case that treatment temperature is generally around room temperature. However, temperature may be increased up to temperature equal to or less than phase transition temperature for adjusting a retardation value. Thereby, alignment state of the liquid crystal molecules is fixed in the extending direction of the plurality of minute grooves 42A and the plurality of minute grooves 42B, and the right-eye region 32A and the left-eye region 32B are formed. Accordingly, the phase difference device 30 is completed.

First Modified Example

The substrate 40 may be formed by a method different from the foregoing method. For example, as the substrate 40, a substrate having a single layer structure is able to be formed by using shape transfer due to heat deformation of the base material film 44. In this case, the base material film 44 is pressed onto the platy master 110 heated up to high temperature, and a minute groove shape is directly formed on the surface of the base material film 44 (not illustrated). Specifically, pressing is performed under high temperature and vacuum atmosphere in a state that the base material film 44 is directly arranged on the surface of the foregoing platy master 110, and the platy master 110 is separated after cooling. Thereby, the substrate 40 having a single layer structure in which a concavity and convexity pattern is transferred is formed. In this case, the phase difference device 30 is able to be formed in a method similar to that of the foregoing manufacturing method, except for the method of manufacturing the substrate 40 having a single layer structure in which a concavity and convexity pattern is transferred.

Case that a Roll-Like Master is Used

Figure 15:
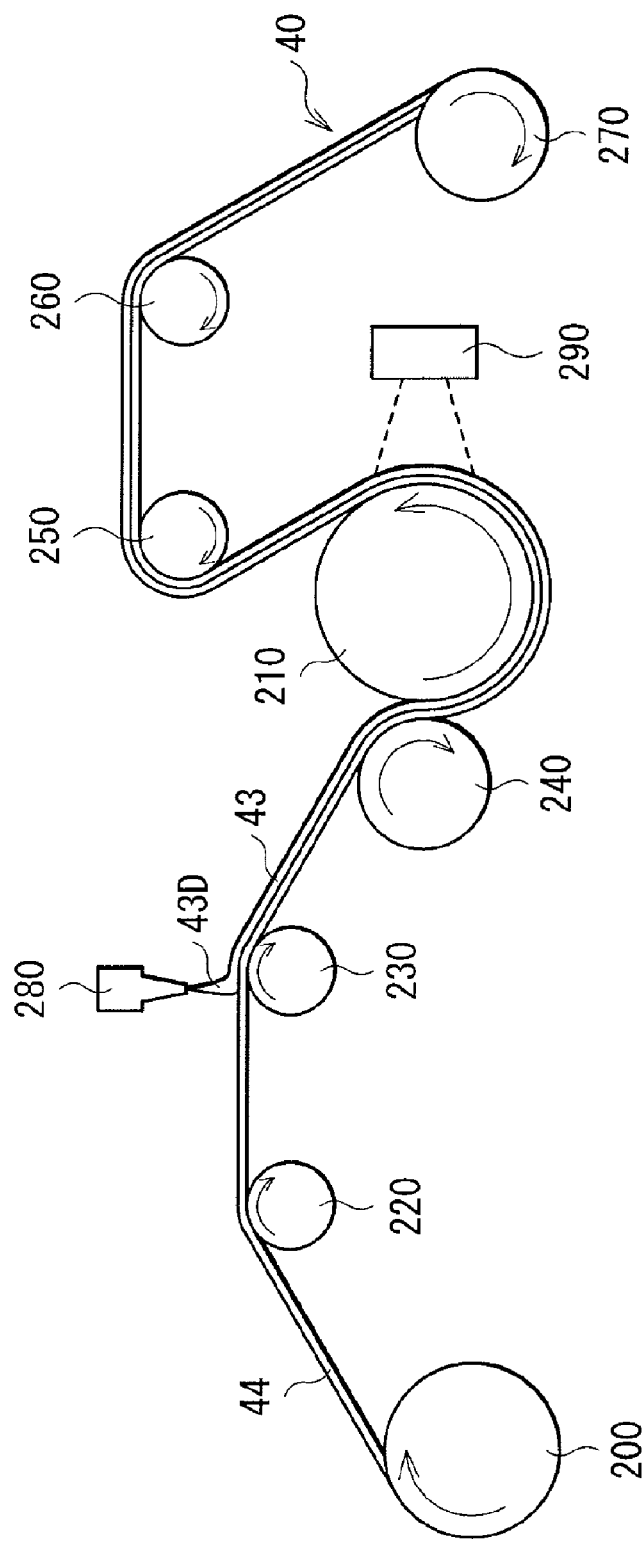
FIG. 15 is a schematic view illustrating an example of a configuration of manufacturing equipment used in another example of a method of manufacturing the phase difference device of FIG. 2A.

FIG. 15 illustrates an example of a configuration of manufacturing equipment for manufacturing the alignment film 31 by a roll-like master. The manufacturing equipment illustrated in FIG. 15 includes a wind-off roll 200, a guide rolls 220, 230, 250, and 260, a nip roll 240, a die roll 210, a wind-up roll 270, a discharger 280, and an ultraviolet irradiator 290. In the wind-off roll 200, the base material film 44 is wound in a concentric fashion, and the wind-off roll 200 is intended to supply the base material film 44. The base material film 44 wound off from the wind-off roll 200 is flown in order of the guide roll 220, the guide roll 230, the nip roll 240, the die roll 210, the guide roll 250, and the guide roll 260, and is finally wound up by the wind-up roll 270. The guide rolls 220 and 230 are intended to guide the base material film 44 supplied from the wind-off roll 200 to the nip roll 240. The nip roll 240 is intended to press the base material film 44 supplied from the guide roll 230 onto the die roll 210. The die roll 210 is arranged with a given clearance from the nip roll 240. On the peripheral face of the die roll 210, the reversal pattern of the plurality of minute grooves 42A and the plurality of minute grooves 42B is formed. The guide roll 250 is intended to exfoliate the base material film 44 wound around the die roll 210. Further, the guide roll 260 is intended to guide the base material film 44 separated by the guide roll 250 to the wind-up roll 270. The discharger 280 is provided with a predetermined clearance from a portion contacted with the guide roll 230 of the base material film 44 supplied from the wind-off roll 200. The discharger 280 is intended to drop, for example, a UV curing resin liquid 43D including an UV curing acryl resin liquid onto the base material film 44. The ultraviolet irradiator 290 is intended to irradiate ultraviolet to a portion of the base material film 44 supplied from the wind-off roll 200 that has already passed the nip roll 240 and that is contacted with the die roll 210.

The substrate 40 is formed by using the manufacturing equipment having the foregoing configuration. Specifically, first, the base material film 44 wound off from the wound-off roll 200 is guided to the guide roll 230 through the guide roll 220. After that, the UV curing resin liquid 43D is dropped from, for example, the discharger 280 onto the base material film 44 to form the UV curing resin layer 43. The UV curing resin layer 43 on the base material film 44 is pressed onto the peripheral face of the die roll 210 by the nip roll 240 through the base material film 44. Thereby, the UV curing resin layer 43 is contacted with the peripheral face of the die roll 210, and the concavity and convexity shape formed on the peripheral face of the die roll 210 is transferred to the UV curing resin layer 43.

After that, the UV curing resin layer 43 is irradiated with ultraviolet from the ultraviolet irradiator 290 to cure the UV curing resin layer 43. Subsequently, the base material film 44 is separated from the die roll 210 by the guide roll 250. After that, the base material film 44 is wound up by the wind-up roll 270 through the guide roll 260. Accordingly, the substrate 40 is formed.

Figure 16:
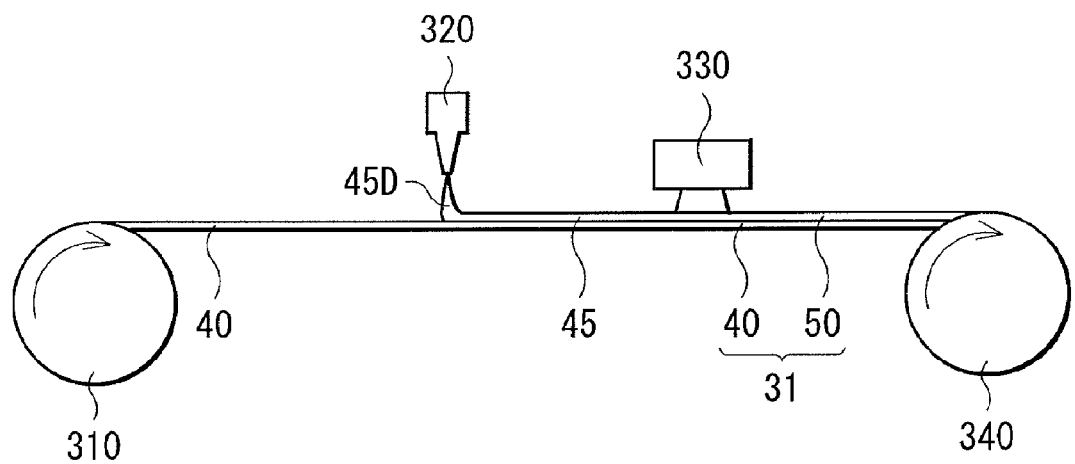
FIG. 16 is a schematic view illustrating an example of a configuration of manufacturing equipment used in a step following FIG. 15.

Next, as illustrated in FIG. 16, after the substrate 40 is wound off from a wind-off roll 310, a UV curing resin liquid 45D including, for example, a UV curing acryl resin liquid is dropped from, for example, a discharger 320 onto the surface of the plurality of minute grooves 42A and the plurality of minute grooves 42B side of the wound-off substrate 40 to form the UV curing resin layer 45.

As the UV curing resin layer 45, a UV curing acryl resin having three or more functional groups is preferably used. For example, the resins shown in Examples 1 to 4 of Table 1 are preferably used. Considering both contact characteristics and dimension change, as the UV curing resin layer 45, a UV curing acryl resin having three or four functional groups is preferably used.

The UV curing resin layer 45 may be made of the same material as that of the UV curing resin layer 43, or may be made of a material different from that of the UV curing resin layer 43. Next, the UV curing layer 45 is irradiated with ultraviolet from an ultraviolet radiator 330 to cure the UV curing layer 45. For example, after the UV curing layer 45 is dried by a heater, the resultant is cured by UV irradiation under, for example, intensity about 1000 mJ/cm$^2$. Thereby, the non-alignment thin film 50 is formed along the surface of the plurality of minute grooves 42A and 42B. Accordingly, the alignment film 31 is formed. After that, the alignment film 31 is wound up by the wind-up roll 340.

Figure 17:
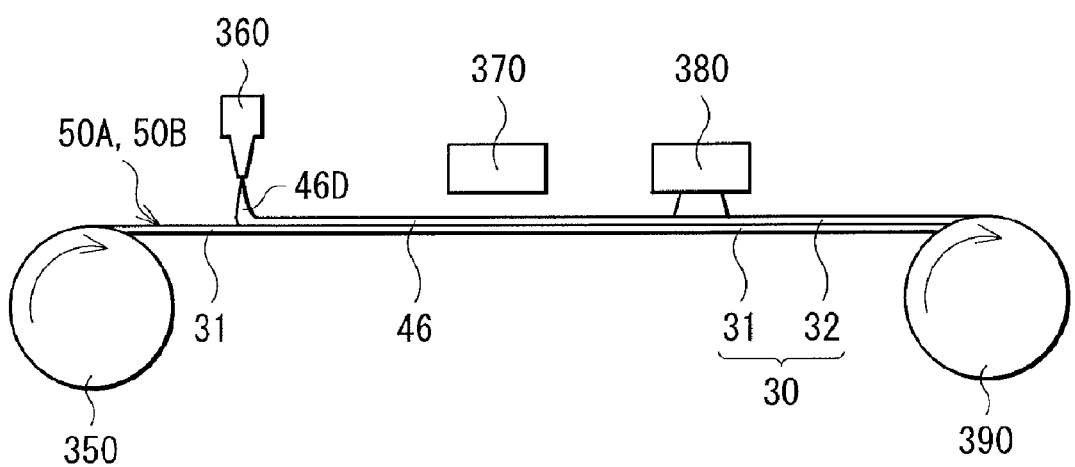
FIG. 17 is a schematic view illustrating an example of a configuration of manufacturing equipment used in a step following FIG. 16.

Next, as illustrated in FIG. 17, after the alignment film 31 is wound off from a wind-off roll 350, a liquid crystal 46D including a liquid crystalline monomer is dropped from, a discharger 360 onto the surface of the plurality of dents 50A and 50B in the wound-off alignment film 31 (upper surface in the figure) to form the liquid crystal layer 46. Subsequently, for the purpose similar to that of the foregoing manufacturing method, alignment treatment (heating treatment) of the liquid crystalline monomer of the liquid crystal layer 46 with which the surface of the alignment film 31 is coated is performed by using a heater 370. After that, the liquid crystal layer 46 is cooled down to temperature slightly lower than the phase transition temperature. Thereby, the liquid crystalline monomer is aligned according to the plurality of minute grooves 42A and the plurality of minute grooves 42B formed on the surface of the alignment film 31. That is, the liquid crystalline monomer is aligned along the extending direction of the plurality of minute grooves 42A and the plurality of minute grooves 42B.

Next, the liquid crystal layer 46 after alignment treatment is irradiated with ultraviolet from an ultraviolet irradiator 380, and thereby the liquid crystalline monomer in the liquid crystal layer 46 is polymerized. At this time, it is often the case that treatment temperature is generally around room temperature. However, temperature may be increased up to temperature equal to or less than phase transition temperature for adjusting a retardation value. Thereby, alignment state of the liquid crystal molecules is fixed in the extending direction of the plurality of minute grooves 42A and the plurality of minute grooves 42B, and the phase difference layer 32 (the right-eye region 32A and the left-eye region 32B) is formed. Accordingly, the phase difference device 30 is completed. After that, the phase difference device 30 is wound up by a wind-up roll 390.

Second Modified Example

Figure 18:
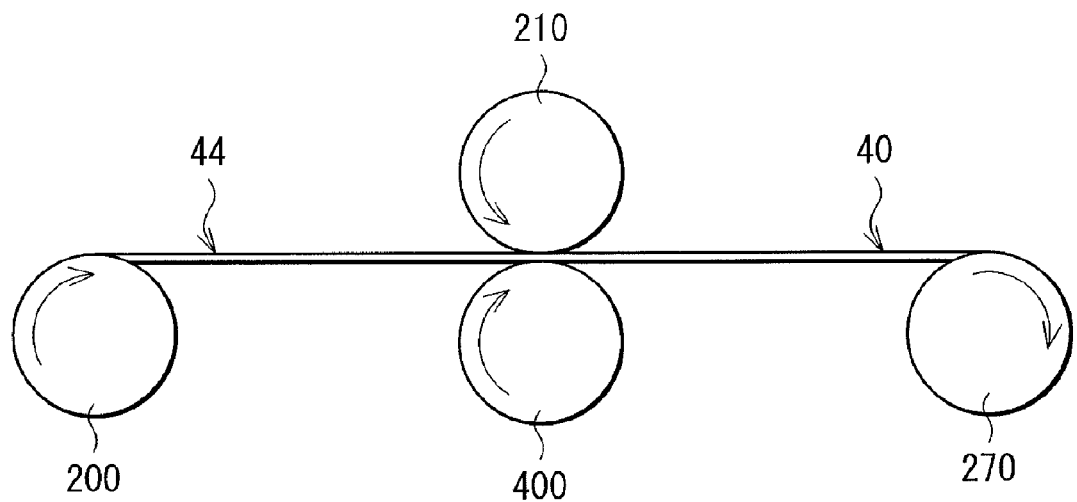
FIG. 18 is a schematic view illustrating an example of a configuration of manufacturing equipment used in still another example of a method of manufacturing the phase difference device of FIG. 2A.

The substrate 40 may be formed by a method different from the foregoing method. For example, as the substrate 40, a substrate having a single layer structure is able to be formed by using shape transfer due to heat deformation of the base material film 44. In this case, the base material film 44 is pressed onto the die roll 210 heated up to high temperature, and a minute groove shape is directly formed on the surface of the base material film 44 (not illustrated). In the case where manufacturing equipment as illustrated in FIG. 15 is used, it is possible that the step of dropping the UV curing resin liquid 43D by the discharger 280 is omitted, and a reversal pattern of the die roll 210 is directly transferred to the base material film 44. Otherwise, as illustrated in FIG. 18, there is a method to form a minute groove shape in the base material film 44 by a relatively simple manufacturing equipment to sandwich the base material film 44 between the die roll 210 heated up to high temperature and a nip roll 400. By such a method, the substrate 40 having a single layer structure in which a concavity and convexity pattern is transferred is able to be formed as well. In the foregoing both cases, the phase difference device 30 is able to be formed in a method similar to that of the foregoing manufacturing method, except for the method of manufacturing the substrate 40 having a single layer structure in which a concavity and convexity pattern is transferred.

Third Modified Example

Figure 19:
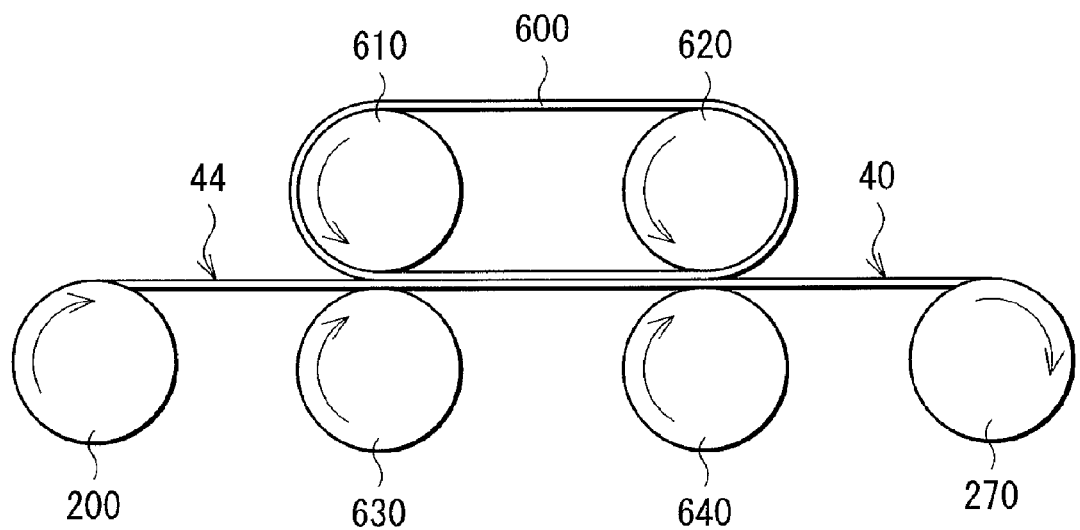
FIG. 19 is a schematic view illustrating another example of a configuration of the manufacturing equipment of FIG. 18.

Further, as a method of manufacturing the substrate 40 having a single layer structure, there is a method of pressing a belt-like master 600 onto the base material film 44 as illustrated in FIG. 19. The manufacturing equipment described in FIG. 19 includes, for example, the belt-like master 600 together with a heating roll 610 and a cooling roll 620 arranged inside the belt-like master 600. The manufacturing equipment further includes, for example, a nip roll 630, an opposed roll 640, the wind-off roll 200, and the wind-up roll 270.

The belt-like master 600 is arranged with a predetermined clearance from the nip roll 630 and the opposed roll 640. On the peripheral face of the belt-like master 600, the reversal pattern of the plurality of minute grooves 42A and the plurality of minute grooves 42B is formed. The belt-like master 600 is made of, for example, a metal material such as nickel, NiP, copper (Cu), and stainless. The heating roll 610 is intended to operate the belt-like master 600 and heat the belt-like master 600. The cooling roll 620 is intended to operate the belt-like master 600 and cool the belt-like master 600. The nip roll 630 and the opposed roll 640 are intended to press the base material film 44 wound off from the wind-off roll 200 onto the belt-like master 600. The nip roll 630 is arranged oppositely to the heating roll 610 with the belt-like master 600 in between. The opposed roll 640 is arranged oppositely to the cooling roll 620 with the belt-like master 600 in between.

The base material film 44 supplied from the wind-off roll 200 is heated and pressed by a portion heated by the heating roll 610 in the belt-like master 600 and the nip roll 630. In the result, a minute groove shape is transferred to the surface of the base material film 44. After that, the base material film 44 is cooled by a portion cooled by the cooling roll 620 in the belt-like master 600 and the opposed roll 640, and is separated from the belt-like master 600. Accordingly, the substrate 40 having a single layer structure in which a concavity and convexity pattern is transferred is formed. Finally, the substrate 40 is wound up by the wind-up roll 270.

When phase transition temperature of the base material film 44 (liquid crystal phase-isotropic phase) is Tg (deg C.), temperature Th (deg C.) of the heating roll 610 is set to temperature so that temperature of a part contacted with the belt-like master 600 in the base material film 44 is Tg (deg C.) or more at the time of transfer. Th (deg C.) is preferably a temperature satisfying Tg+60 deg C.<Th<Tg+90 deg C. Further, temperature Tc (deg C.) of the cooling roll 620 is set to a temperature so that temperature of a part contacted with the belt-like master 600 in the base material film 44 is lower than Tg (deg C.) at the time of separation. Tc (deg C.) is preferably, for example, a temperature satisfying Tc<Tg.

Further, the belt-like master 600 is preferably seamless. For example, the seamless belt-like master 600 is able to be formed by growing nickel or the like on a cylindrical resin master having a concavity and convexity shape on the internal face side by electroforming method or forming a concavity and convexity shape by winding a material around a cylindrical roll and directly providing precision cutting work. The method of forming the belt-like master 600 is not limited to the foregoing methods.

The phase difference device 30 is able to be formed by a method similar to that of the foregoing manufacturing method, except for the method of manufacturing the substrate 40.

Method of Manufacturing the Display Unit 1

Next, a description will be given of an example of a method of manufacturing the display unit 1. First, a laminated body (not illustrated) sequentially including the transparent substrate 22, the pixel electrode 23, the alignment film 24, the liquid crystal layer 25, the alignment film 26, the common electrode 27, the color filter 28, and the transparent substrate 29 is prepared. Next, the polarization plate 21A is bonded to the surface on the transparent substrate 22 side of the laminated body, and the polarization plate 21B is bonded to the surface on the transparent substrate 29 side of the laminated body. Accordingly, the liquid crystal display panel 20 is completed. Next, after the phase difference device 30 is bonded to the polarization plate 21B, the backlight unit 10 is mounted on the polarization plate 21A side of the liquid crystal display panel 20. Accordingly, the display unit 1 is completed.

Basic Operation

Next, a description will be given of an example of a basic operation in displaying an image in the display unit 1 of this embodiment with reference to FIGS. 8A and 8B to FIGS. 11A and 11B and the like.

First, in a state that light irradiated from the backlight unit 10 enters the liquid crystal display panel 20 in FIG. 7 or the like, a parallax signal including a right-eye image and a left-eye image as a video signal is inputted to the liquid crystal display panel 20. The right-eye image light L2 is outputted from a pixel in an odd number row (FIGS. 8A and 8B or FIGS. 9A and 9B), and the left-eye image light L3 is outputted from a pixel in an even number row (FIGS. 10A and 10B or FIGS. 11A and 11B). In practice, the right-eye image light L2 and the left-eye image light L3 are outputted in a mixed state.

However, in FIGS. 8A and 8B to FIGS. 11A and 11B, the right-eye image light L2 and the left-eye image light L3 are separately illustrated for the sake of convenience in description.

After that, the right-eye image light L2 and the left-eye image light L3 are converted into oval polarized light by the right-eye region 32A and the left-eye region 32B of the phase difference device 30, is transmitted through the alignment film 31 of the phase difference device 30, and is outputted outside from the image display face of the display unit 1.

After that, the light outputted outside of the display unit 1 enters the polarized glasses 2. The oval polarized light is returned to linear polarized light by the right-eye phase difference film 61B and the left-eye phase difference film 62B. Thereafter, light enters the polarization plates 61A and 62A of the polarized glasses 2.

At this time, a polarization axis of light corresponding to the right-eye image light L2 of light entering the polarization plates 61A and 62A is in parallel with the polarization axis AX7 of the polarization plate 61A (FIG. 8A and FIG. 9A), and is orthogonal to the polarization axis AX8 of the polarization plate 62A (FIG. 8B and FIG. 9B). Thus, the light corresponding to the right-eye image light L2 of light entering the polarization plates 61A and 62A is transmitted through only the polarization plate 61A, and reaches a right eye of an observer (FIGS. 8A and 8B or FIGS. 9A and 9B).

Meanwhile, a polarization axis of light corresponding to the left-eye image light L3 of light entering the polarization plates 61A and 62A is orthogonal to the polarization axis AX7 of the polarization plate 61A (FIG. 10A and FIG. 11A), and in parallel with the polarization axis AX8 of the polarization plate 62A (FIG. 10B and FIG. 11B). Thus, the light corresponding to the left-eye image light L3 of light entering the polarization plates 61A and 62A is transmitted through only the polarization plate 62A, and reaches a left eye of the observer (FIGS. 10A and 10B or FIGS. 11A and 11B).

As described above, the light corresponding to the right-eye image light L2 reaches the right eye of the observer, and the light corresponding to the left-eye image light L3 reaches the left eye of the observer. In the result, the observer is able to recognize as if a stereoscopic image is displayed on the image display face of the display unit 1.

Effect

In this embodiment, the non-alignment thin film 50 is formed along the surface of the plurality of minute grooves 42A and 42B formed on the surface of the substrate 40. Thereby, in the course of manufacturing, in the case where the liquid crystal layer 46 is formed on the alignment film 31, the ratio of influence of molecular alignment of the surface of the substrate 40 on the liquid crystal layer 46 on the alignment film 31 is able to be decreased more than in the case where the liquid crystal layer 46 is directly formed on the surface of the plurality of minute grooves 42A and 42B. In the result, even if the molecules on the surface of the plurality of minute grooves 42A and 42B are aligned in the direction different from the extending direction of the plurality of minute grooves 42A and 42B, for example, alignment direction of the liquid crystal layer 46 (phase difference layer 32) on the alignment film 31 is able to be aligned with the extending direction of the dent formed by the non-alignment thin film 50 in the course of manufacturing. In the result, possibility that the alignment direction of the liquid crystal layer 46 (phase difference layer 32) is shifted from a desired direction is able to be decreased.

Figure 20:
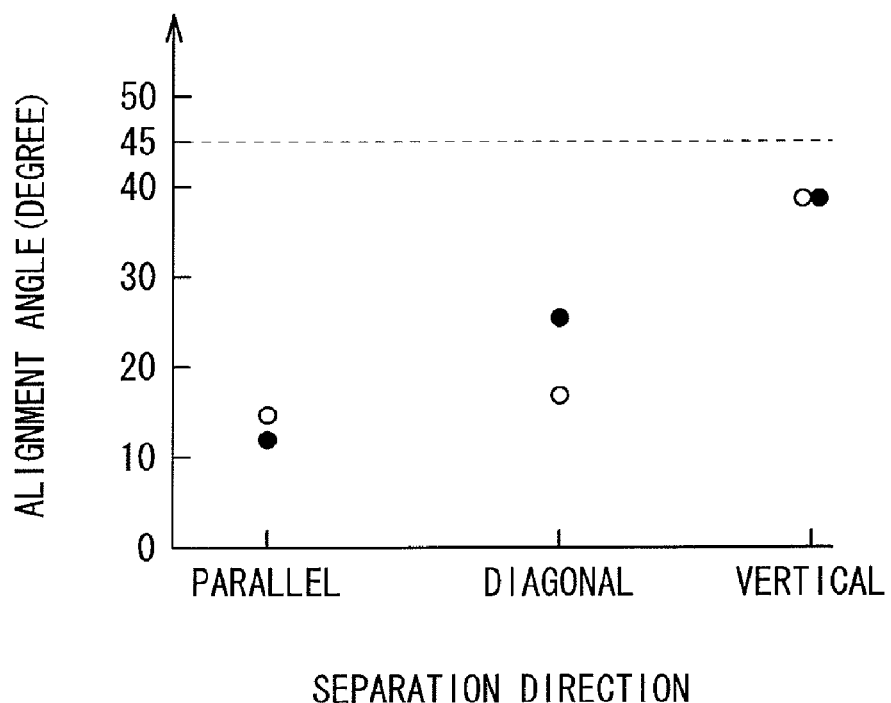
FIG. 20 is a characteristics diagram illustrating alignment angle of a phase difference device formed by an existing manufacturing method.
Figure 21:
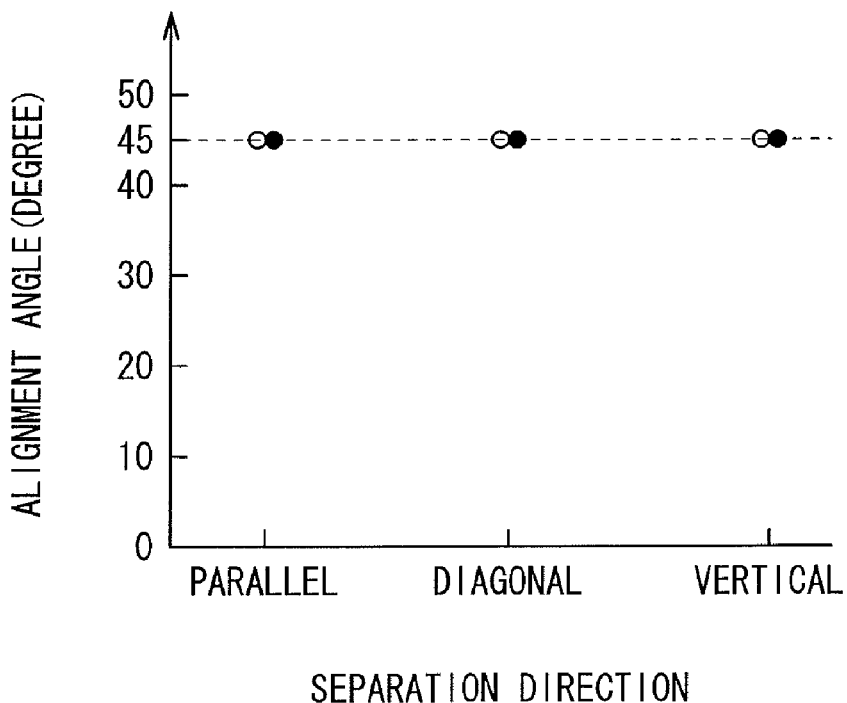
FIG. 21 is a characteristics diagram illustrating alignment angle of a phase difference device formed by the manufacturing method of this embodiment.

FIG. 20 illustrates a relation between alignment angle (alignment angle of a slow axis) of an existing type phase difference device in which the liquid crystal layer 46 (phase difference layer 32) is directly formed on the surface of the plurality of minute grooves 42A and 42B and separation direction in separating a base material film from a master. FIG. 21 illustrates a relation between alignment angle of the phase difference device 30 of this embodiment and separation direction. Black circles in the figure indicate an alignment angle corresponding to the minute groove 42A, and white circles in the figure indicate an alignment angle corresponding to the minute groove 42B. Further, in the separation direction in FIGS. 20 and 21, "parallel" means that a direction is in parallel with the boundary BL1 of FIG. 4B, "diagonal" means that a direction is crossing with the boundary BL1 at 45 degrees, and "vertical" means that a direction is orthogonal to the boundary BL1.

From FIG. 20, it is found that in the existing type phase difference device, all alignment angles of the phase difference device are shifted from 45 degrees as the desired angle without relation to separation direction. In particular, it is found that in the case where separation is made in the direction in parallel with the boundary BL1 which is a separation direction in forming the alignment film 31 by the roll-like master, the alignment angle of the phase difference device is largely shifted from 45 degrees as the desired angle for the following reason. That is, the molecular alignment of the surface of the plurality of minute grooves 42A and 42B is in the direction different from the extending direction of the plurality of minute grooves 42A and 42B, and alignment of the liquid crystal molecules on the plurality of minute grooves 42A and 42B is disturbed in the course of manufacturing. Further, since the alignment angle of the phase difference device is shifted from 45 degrees, when a phase difference pattern formed by inserting a $\lambda/4$ plate into a polarization microscope is observed while rotating the existing phase difference device, the existing phase difference device does not show sufficient function as a shutter.

Meanwhile, from FIG. 21, it is found that in the phase difference device 30 of this embodiment, all alignment angles of the phase difference device 30 are 45 degrees as the desired angle without relation to separation direction. It means that the non-alignment thin film 50 reduces influence of molecular alignment of the surface of the substrate 40 on the liquid crystal layer 46 on the alignment film 31 in the course of manufacturing. Thereby, the alignment direction of the liquid crystal layer 46 (phase difference layer 32) is able to be aligned with the extending direction of the plurality of minute grooves 42A or the plurality of minute grooves 42B directly under thereof. Further, since the alignment angles of the phase difference device were 45 degrees or almost 45 degrees, when a phase difference pattern formed by inserting a $\lambda/4$ plate into a polarization microscope is observed while rotating the phase difference device 30, the phase difference device 30 of this embodiment functions as a shutter.

Figure 22A:
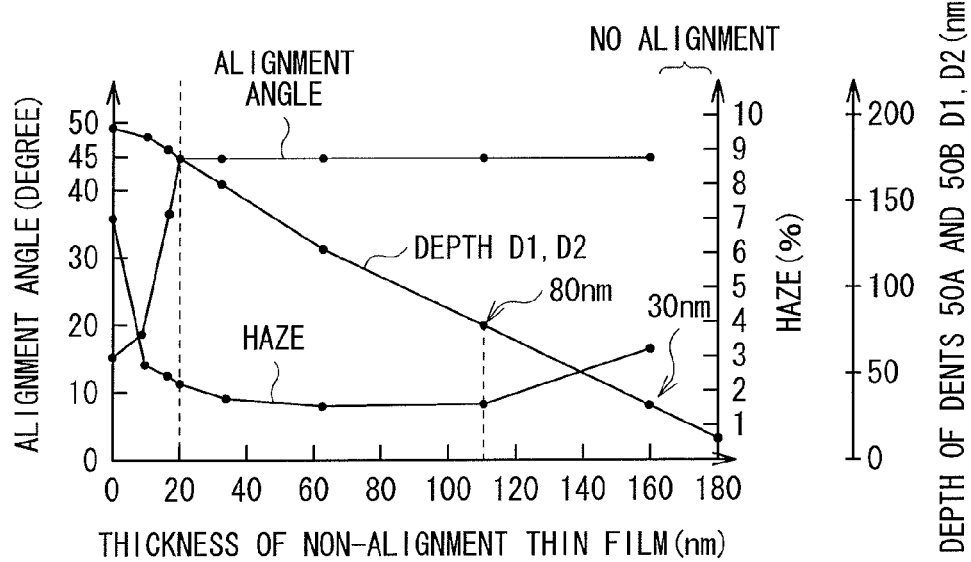
FIGS. 22A and 22B are characteristics diagrams illustrating thickness dependence of the alignment angle of the phase difference device formed by the manufacturing method of this embodiment.
Figure 22B:
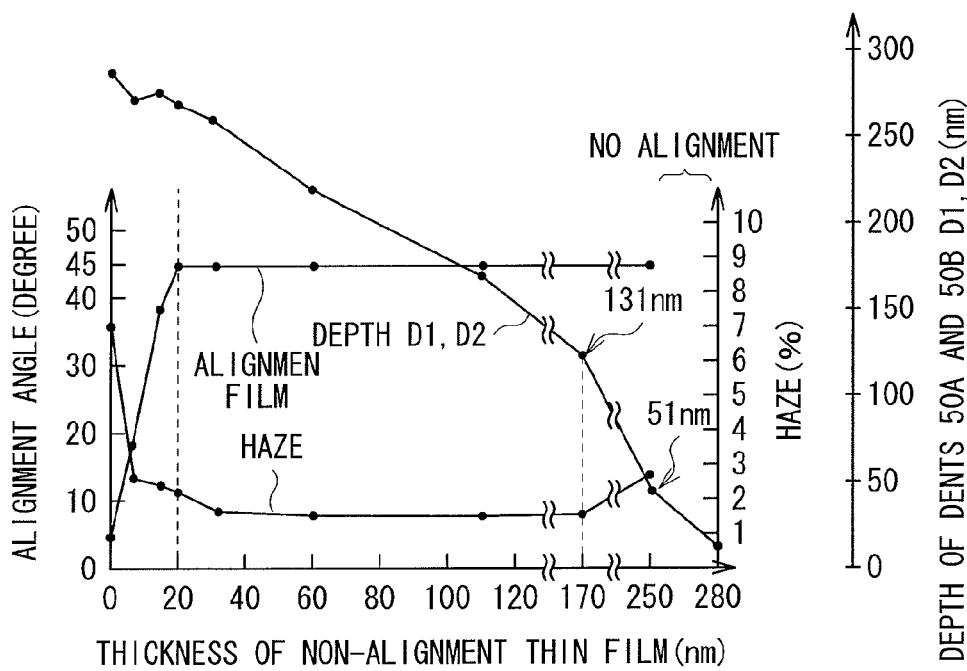

FIGS. 22A and 22B illustrate an example of a relation between a thickness of the non-alignment thin film 50 and an alignment angle of the phase difference device 30/haze/the depth D1 and D2 of the respective dents 50A and 50B. FIG. 22A illustrates a result obtained by setting the height H of the stripe-shaped mountain adjacent to the respective minute grooves 42A and 42B formed in the substrate 40 to about 200 nm (practically 195 nm). FIG. 22B illustrates a result obtained by setting the height H to about 300 nm (practically 292 nm). The thickness of the non-alignment thin film 50 illustrated in FIGS. 22A and 22B is a thickness of a section corresponding to the bottom part of the respective dents 50A and 50B of the non-alignment thin film 50 or a thickness of a section corresponding to the apex section of the stripe-shaped mountain adjacent to the respective dents 50A and 50B of the non-alignment thin film 50. Table 2 illustrates specific numerical values of FIG. 22A. Table 3 illustrates specific numerical values of FIG. 22B. The thickness of the non-alignment thin film 50 is adjusted by changing the solid content of the UV curing resin layer 45 as a precursor of the non-alignment thin film 50 in the course of manufacturing the non-alignment thin film 50 (see table 2 and table 3).

in the range in which the liquid crystal layer 46 is aligned in the course of manufacturing. The depths D1 and D2 of the dents 50A and 50B are preferably in the range in which the liquid crystal layer 46 is aligned in the course of manufacturing (30 nm or more).

Further, from FIGS. 22A and 22B, it is found that in terms of haze (3% or less) as an index of alignment characteristics

TABLE 2

| Solid content (wt %) | Thickness of non-alignment thin film (nm) | Height of mountain H (nm) | Depth of dent D1 and D2 (nm) | Liquid crystal alignment angle (degrees) | Liquid crystal alignment haze (%) |
|---|---|---|---|---|---|
| 0.0 | 0 | 198 | 196 | poor ($\theta 1$: 15, $\theta 2$: −15) | average (7.1) |
| 0.2 | 8 | 198 | 190 | poor ($\theta 1$: 18, $\theta 2$: −17) | average (2.8) |
| 0.4 | 16 | 199 | 183 | poor ($\theta 1$: 37, $\theta 2$: −38) | average (2.6) |
| 0.5 | 20 | 200 | 180 | good ($\theta 1$: 45, $\theta 2$: −45) | average (2.2) |
| 0.8 | 32 | 201 | 169 | good ($\theta 1$: 45, $\theta 2$: −45) | good (1.8) |
| 1.5 | 62 | 190 | 128 | good ($\theta 1$: 45, $\theta 2$: −45) | good (1.6) |
| 2.7 | 110 | 190 | 80 | good ($\theta 1$: 45, $\theta 2$: −45) | good (1.6) |
| 4.0 | 160 | 190 | 30 | good ($\theta 1$: 45, $\theta 2$: −45) | average (3.1) |
| 4.3 | 176 | 189 | 13 | Non-alignment | Non-alignment |

TABLE 3

| Solid content (wt %) | Thickness of non-alignment thin film (nm) | Height of mountain H (nm) | Depth of dent D1 and D2 (nm) | Liquid crystal alignment angle (degrees) | Liquid crystal alignment haze (%) |
|---|---|---|---|---|---|
| 0.0 | 0 | 296 | 296 | poor ($\theta 1$: 15, $\theta 2$: −16) | average (7.1) |
| 0.2 | 7 | 288 | 281 | poor ($\theta 1$: 19, $\theta 2$: −17) | average (2.8) |
| 0.3 | 14 | 299 | 285 | poor ($\theta 1$: 38, $\theta 2$: −38) | average (2.6) |
| 0.5 | 21 | 300 | 279 | good ($\theta 1$: 45, $\theta 2$: −45) | average (2.2) |
| 0.8 | 31 | 298 | 267 | good ($\theta 1$: 45, $\theta 2$: −45) | good (1.8) |
| 1.5 | 61 | 290 | 229 | good ($\theta 1$: 45, $\theta 2$: −45) | good (1.6) |
| 2.7 | 110 | 290 | 180 | good ($\theta 1$: 45, $\theta 2$: −45) | good (1.6) |
| 4.1 | 170 | 301 | 131 | good ($\theta 1$: 45, $\theta 2$: −45) | good (1.6) |
| 6.0 | 250 | 301 | 51 | good ($\theta 1$: 45, $\theta 2$: −45) | average (2.8) |
| 6.8 | 280 | 301 | 21 | Non-alignment | Non-alignment |

From FIGS. 22A and 22B, it is found that in the case where the thickness of the non-alignment thin film 50 is less than 20 nm, as the thickness of the non-alignment thin film 50 is decreased, influence of molecular alignment of the surface of the substrate 40 on the liquid crystal layer 46 on the alignment film 31 is gradually increased. Accordingly, it is found that for reducing influence of molecular alignment of the surface of the substrate 40 on the liquid crystal layer 46 on the alignment film 31, the non-alignment thin film 50 preferably has a certain level of thickness (20 nm or more). In the case where the non-alignment thin film 50 is excessively thick and the dents 50A and 50B are excessively small, the liquid crystal layer 46 is not aligned in the course of manufacturing. Thus, the thickness of the non-alignment thin film 50 is preferably of the phase difference layer 32, the depths D1 and D2 of the respective dents 50A and 50B are preferably deep to some extent, for example, 80 nm.

Modified Example

In the foregoing embodiment, the case that the phase difference device 30 is provided on the polarization plate 21B has been exemplified. However, the phase difference device 30 may be provided in other place. For example, though not illustrated, the phase difference device 30 may be provided between the polarization plate 21B and the transparent substrate 29. In the display unit 1 having such a configuration, light irradiated from the backlight unit 10 enters the polarization plate 21A, and only polarization component in the horizontal direction is transmitted and enters the phase difference device 30. The light transmitted through the phase difference device 30 is transmitted through the liquid crystal display panel 20 and the polarization plate 21B sequentially, and is outputted as a polarization component in the vertical direction. Thereby, two dimensional display is made. In this case, since the phase difference device 30 is arranged, phase difference of liquid crystal viewed in the diagonal direction is compensated, and thus leakage light in the diagonal direction and color in black display are able to be decreased. That is, the phase difference device 30 is able to be used as a view angle compensation film such as an A plate and a C plate.

The display unit 1 according to this modified example is able to be manufactured as follows. First, a laminated body (not illustrated) sequentially including the transparent substrate 22, the pixel electrode 23, the alignment film 24, the liquid crystal layer 25, the alignment film 26, the common electrode 27, the color filter 28, and the transparent substrate 29 is prepared. Next, the polarization plate 21A is bonded to the surface on the transparent substrate 22 side of the laminated body, and the phase difference device 30 is bonded to the surface on the transparent substrate 29 side of the laminated body. Next, the polarization plate 21B is bonded to the phase difference device 30. After that, the backlight unit 10 is mounted on the polarization plate 21B. Accordingly, the display unit 1 according to this modified example is completed.

In the foregoing embodiment, the case in which the thickness of the non-alignment thin film 50 is sufficiently small compared to the depth of the plurality of minute grooves 42A and 42B is exemplified. However, for example, the thickness of the non-alignment thin film 50 may be equal to or larger than the depth of the plurality of minute grooves 42A and 42B.

Further, in the foregoing embodiment, the phase difference device 30 is provided with two types of phase difference regions (the right-eye region 32A and the left-eye region 32B) with slow axis direction different from each other. However, the phase difference device 30 may be provided with three types or more of phase difference regions with each slow axis direction different from each other.

Further, in the foregoing embodiment, the case in which the phase difference regions (the right-eye region 32A and the left-eye region 32B) of the phase difference device 30 extend in the horizontal direction is exemplified. However, the phase difference regions (the right-eye region 32A and the left-eye region 32B) of the phase difference device 30 may extend in other direction.

Further, in the foregoing embodiment and the foregoing modified example, the case in which the phase difference regions (the right-eye region 32A and the left-eye region 32B) of the phase difference device 30 wholly extend in the horizontal direction or in the vertical direction is exemplified. However, the phase difference regions (the right-eye region 32A and the left-eye region 32B) of the phase difference device 30 may be arranged two dimensionally both in the horizontal direction and in the vertical direction.

Further, in the foregoing embodiment and the foregoing respective modified example, the case in which the phase difference device 30 is applied to the display unit 1 is exemplified. However, it is needless to say that the phase difference device 30 is able to be applied to other device.

Further, in the foregoing embodiment and the foregoing respective modified example, a member for controlling light divergence angle of light outputted from the liquid crystal display panel 20 (for example, an antiglare film) is not particularly provided. However, for example, such a member may be provided in a region that is between the liquid crystal display panel 20 and the phase difference device 30 and that is not opposed to the pixel electrode 23 in the liquid crystal display panel 20.

The description is hereinbefore given of the case that the polarized glasses 2 are circular polarized glasses and the display unit 1 is a display unit for circular polarized glasses. However, the application is able to be applied to a case that the polarized glasses 2 are linear polarized glasses and the display unit 1 is a display unit for linear polarized glasses.

Examples

A description will be given of examples of a method of manufacturing the phase difference device 30. The following description will be hereinafter separately given of a case that a platy master was used and a case that a roll-like master was used in manufacturing the alignment film 31 included in the phase difference device 30.

Case that a Platy Master was Used

First, the platy master 110 used for forming the substrate 40 was formed by using femtosecond laser. At this time, as the master 110, SUS (stainless steel) that was provided with mirror-like finishing and that had a thickness of 1 mm was used. Next, the UV curing resin layer 43 including a UV curing acryl resin liquid was arranged on the surface of the platy master 110. After that, the UV curing resin layer 43 was sealed with the base material film 44 composed of TAC. Next, the UV curing resin layer 43 was irradiated with ultraviolet from the substrate 40 side to cure the UV curing resin layer 43. After that, the master 110 was separated. Thereby, the substrate 40 was formed.

At this time, three types of the substrates 40 with separation direction different from each other were formed. Specifically, the substrate 40 separated in the direction in parallel with the boundary BL1, the substrate 40 separated in the direction crossing with the boundary BL1 at 45 degrees, and the substrate 40 separated in the direction orthogonal to the boundary BL1 were formed. Each surface of the respective substrates 40 was observed by an Atomic Force Microscope (AFM). In the result, it was able to be confirmed that the plurality of minute grooves 42A with submicron order extended in the +45 degrees direction with respect to the boundary BL1 and the plurality of minute grooves 42B with submicron order extended in the −45 degrees direction with respect to the boundary BL1.

Next, the UV curing resin layer 45 made of an MEK solution including 1.5 w % of a UV curing resin liquid was formed on the respective substrates 40 by spin coating method. At this time, the thickness of the UV curing resin layer 45 was adjusted so that the plurality of minute grooves 42A and 42B were not eliminated by the UV curing resin layer 45 after curing. Specifically, the thickness of the UV curing resin layer 45 was adjusted so that the UV curing resin layer 45 after curing became 5 nm, 15 nm, 30 nm, 60 nm, or 100 nm. Subsequently, the UV curing resin layer 45 was irradiated with ultraviolet to cure the UV curing resin layer 45. Thereby, the non-alignment thin film 50 was formed. As described above, various alignment films 31 were formed. When each cross section of the alignment film 31 was observed by a Scanning Electron Microscope (SEM), it was able to be confirmed that the non-alignment thin film 50 having a thickness of 60 nm was formed along the surface of the plurality of minute grooves 42A and 42B.

Subsequently, the liquid crystal layer 46 including the liquid crystalline monomer was formed on the respective alignment films 31 by spin coating method. After that, the liquid crystal layer 46 was heated for 2 minutes at 55 deg C., and the liquid crystal layer 46 was irradiated with ultraviolet under nitrogen atmosphere. Accordingly, various phase transition devices 30 were formed.

Case that a Roll-Like Master was Used

First, the die roll 210 used for forming the substrate 40 was formed by using femtosecond laser. At this time, as the die roll 210, an SUS roll that was provided with mirror-like finishing and that had a diameter of 100 mm and had a width of 150 mm was used. Next, the base material film 44 as a TAC film having a width of 140 mm wound off from the wind-off roll 200 was guided through the guide roll 220 to the guide roll 230. After that, the UV curing resin liquid 43D including a UV curing acryl resin liquid was dropped from the discharger 280 to form the UV curing resin layer 43. Next, the UV curing resin layer 43 on the base material film 44 was pressed onto the peripheral face of the die roll 210 by the nip roll 240 through the base material film 44, and concavity and convexity shape formed in the peripheral face of the die roll 210 was transferred onto the UV curing resin layer 43. After that, the UV curing resin layer 43 was irradiated with ultraviolet UV from the ultraviolet irradiator 290 to cure the UV curing resin layer 43. Subsequently, the base material film 44 was separated from the die roll 210 by the guide roll 250. After that, the base material film 44 was wound up by the wind-up roll 270 through the guide roll 260. Accordingly, the substrate 40 was formed.

At this time, the base material film 44 was separated from the die roll 210 in the direction in parallel with the boundary BL1. The surface of the substrate 40 was observed by AFM. In the result, it was able to be confirmed that the plurality of minute grooves 42A with submicron order extended in the +45 degrees direction with respect to the boundary BL1 and the plurality of minute grooves 42B with submicron order extended in the −45 degrees direction with respect to the boundary BL1.

Next, the substrate 40 was wound off from the wind-off roll 310. After that, the UV curing resin layer 45 including the UV curing acryl resin liquid was formed on the surface on the side of the plurality of minute grooves 42A and the plurality of minute grooves 42B of the wound-off substrate 40 by coating. At that time, the thickness of the UV curing resin layer 45 was adjusted so that the plurality of minute grooves 42A and 42B were not eliminated by the UV curing resin layer 45 after curing. Specifically, the thickness of the UV curing resin layer 45 was adjusted so that the UV curing resin layer 45 after curing became 5 nm, 15 nm, 30 nm, 60 nm, or 100 nm. The thickness of the UV curing resin layer 45 was adjusted by the wind-off rate of the substrate 40. Subsequently, the UV curing resin layer 45 was irradiated with ultraviolet to cure the UV curing resin layer 45. Thereby, the non-alignment thin film 50 was formed. As described above, various alignment films 31 were formed. When cross sections of the various alignment films 31 were observed by an SEM, it was able to be confirmed that the non-alignment thin film 50 having a thickness of 60 nm was formed along the surface of the plurality of minute grooves 42A and 42B.

Next, after the alignment film 31 was wound off from the wind-off roll 350, the liquid crystal layer 46 including the liquid crystalline monomer was formed on the surface of the plurality of dents 50A and 50B in the wound-off alignment film 31. Subsequently, the liquid crystal layer 46 was passed through a dry zone under the conditions that temperature of the dry zone was 100 deg C., passing speed was 1.0 m/min, and length of the dry zone was 1 m. Further, the liquid crystal layer 46 was irradiated with ultraviolet under nitrogen atmosphere. Accordingly, the phase transition device 30 was formed.

Relation Between Alignment Angle and Separation Direction

Further, relation between alignment angle of the various phase difference devices 30 formed as described above and separation direction in separating the base material film 44 from the master was evaluated. The result corresponded with the foregoing content of FIG. 18. That is, all alignment angles of the phase difference device 30 were 45 degrees as the desired angle without relation to separation direction. Thus, it was found that in the course of manufacturing the phase difference device 30 according to the examples, the non-alignment thin film 50 reduced influence of molecular alignment of the surface of the substrate 40 on the liquid crystal layer 46 on the alignment film 31.

Relation Between Alignment Angle and Thickness of the Non-Alignment Thin Film 50

Further, relation between alignment angle of the various phase difference devices 30 formed as described above and thickness of the non-alignment thin film 50 was evaluated. The result corresponded with the foregoing content of FIG. 22. That is, it was found that the non-alignment thin film 50 should have a certain degree of thickness (20 nm or more) in order to reduce influence of molecular alignment of the surface of the substrate 40 on the liquid crystal layer 46 on the alignment film 31.

The pattern regions of the die roll 210 corresponding to the minute grooves 42A and 42B formed by the femtosecond laser have a periodic structure to some extent, but the period of the periodic structure or directions of projections and depressions in the periodic structure have fluctuations. In other words, the pattern regions have a fluctuated periodic structure. In the case where the mold on which the pattern regions have fluctuations is used to perform transfer to a substrate, an uneven shape having fluctuations is transferred to a surface of the substrate. When a liquid crystal layer is formed on the surface of the substrate, the liquid crystal layer is formed on the uneven shape (grooves 42A and 42B) having fluctuations.

In the case where projections and depressions have a periodic structure (including the case where projections and depressions have fluctuations to some extent), when the refractive indexes of the liquid crystal molecules of the liquid crystal layer 46 and the base material film 44 are different from each other, a part of incident light is diffracted. For example, in the case where the phase difference device (film) is used for a display, when outside light such as light from a fluorescent lamp enters, a difference in the influence of the diffracted light is evident. More specifically, in the case where the uneven shape does not have fluctuations, when outside light such as light from the fluorescent lamp enters into the display, a screen of the display looks rainbow-colored. On the other hand, in the case where the uneven shape (grooves 42A and 42B) has fluctuations, even if outside light such as light from the fluorescent lamp enters into the display, the diffracted light is blurred, thereby the screen of the display is not rainbow-colored. Therefore, in the uneven shapes, the period or the directions of projections and depressions preferably have fluctuations.

Next, to what extent fluctuations are preferable is considered. Herein, not described in the figure, DFT (discrete Fourier transform) analysis is performed on photograph data of the pattern region of the die roll 210 or the grooves 42A and 42B to quantify the photograph data depending on how wide the fluctuations are in a spatial frequency region. To quantify a DFT image, fitting is performed using the following Gauss function around a spatial frequency at which the power spectrum density (PSD) of the DFT image is at the maximum.

$$PSD = A\exp[-\{(f-f_0)/f_W\}^2 - \{(\theta-\theta_0)/\theta_W\}^2 \quad \text{[Mathematical Formula] 5}$$

In this case, "f" is a spatial frequency, and "θ" is an angle. Moreover, "$f_0$" is a spatial frequency at which the PSD is at the maximum, and "$\theta_0$" is an angle at which the PSD is at the maximum. Further, "$f_W$" and "$\theta_W$" are amounts indicating a spread around a peak. When the spread of pitches of projections and depressions and the spread of angles of projections and depressions are determined based on the Gauss function, in the case where fluctuations are present, the spread of the pitches is approximately 2 to 10%, and the spread of the angles is approximately 3 to 8%, but on the other hand, in the case where fluctuations are not present, the spread of the pitches is as small as approximately 0 to 2%, and the spread of the angles is as small as approximately 0 to 1%.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A laminated body comprising:
   an alignment film comprising:
   a substrate having a plurality of grooves extending in a specific direction on a surface; and
   a non-alignment thin film formed along a surface of the plurality of grooves wherein the plurality of grooves include a plurality of first grooves extending in a first direction and a plurality of second grooves extending in a second direction crossing with the first direction,
   wherein a first elongated groove region including the plurality of first grooves and a second elongated groove region including the plurality of second grooves are respectively strip-shaped in a common extension direction and are alternately arranged, and
   wherein a bisector on an angle formed between the first direction and the second direction is at least substantially parallel to the common extension direction of the first elongated groove region and the second elongated groove region; and
   a liquid crystal layer that is aligned along an extending direction of a dent formed by the non-alignment thin film and is polymerized.

2. The laminated body according to claim 1, wherein the non-alignment thin film has a thickness of 20 nm or more, and
   a depth of a dent formed by the non-alignment thin film is 30 nm or more.

3. The laminated body according claim 1, wherein the substrate has a structure in which a resin layer is provided on a base material film.

4. The laminated body according to claim 3, wherein the base material film is composed of COP (cycloolefin polymer) or TAC (triacetyl cellulose).

5. The laminated body according to claim 3, wherein the resin layer is made of a UV curing resin.

6. The laminated body according to claim 1, wherein the non-alignment thin film is formed by curing a UV curing resin having three or more functional groups.

7. The laminated body according to claim 1, wherein the angle formed between the first direction and the second direction is a right angle.

8. A phase difference device comprising:
   an alignment film that has a substrate having a plurality of grooves extending in a specific direction on a surface and a non-alignment thin film formed along a surface of the plurality of grooves; and
   a phase difference layer that is provided being contacted with a surface of the non-alignment thin film, and includes a liquid crystal material that is aligned along an extending direction of a dent formed by the non-alignment thin film and is polymerized,
   wherein the plurality of grooves include a plurality of first grooves extending in a first direction and a plurality of second grooves extending in a second direction crossing with the first direction,
   wherein a first elongated groove region including the plurality of first grooves and a second elongated groove region including the plurality of second grooves are respectively strip-shaped in a common extension direction and are alternately arranged, and
   wherein a bisector on an angle formed between the first direction and the second direction is at least substantially parallel to the common extension direction of the first elongated groove region and the second elongated groove region.

9. The phase difference device according to claim 8, wherein the non-alignment thin film has a thickness of 20 nm or more, and
   a depth of a dent formed by the non-alignment thin film is 30 nm or more.

10. The phase difference device according to claim 8, wherein the substrate has a structure in which a resin layer is provided on a base material film.

11. The phase difference device according to claim 10, wherein the base material film is composed of COP (cycloolefin polymer) or TAC (triacetyl cellulose).

12. The phase difference device according to claim 10, wherein the resin layer is made of a UV curing resin.

13. The phase difference device according to claim 8, wherein the non-alignment thin film is formed by curing a UV curing resin having three or more functional groups.

14. The phase difference device according to claim 8, wherein the angle formed between the first direction and the second direction is a right angle.

15. A display unit comprising:
    a display panel driven based on an image signal;
    a backlight unit illuminating the display panel; and
    a phase difference device provided on the side opposite to the backlight unit with respect to the display panel,
    wherein the phase difference device includes
    an alignment film that has a substrate having a plurality of grooves extending in a specific direction on a surface and a non-alignment thin film formed along a surface of the plurality of grooves, and
    a phase difference layer that is provided being contacted with a surface of the non-alignment thin film, and includes a liquid crystal material that is aligned along an extending direction of a dent formed by the non-alignment thin film and is polymerized, wherein the plurality of grooves include a plurality of first grooves extending in a first direction and a plurality of second grooves extending in a second direction crossing with the first direction, wherein a first elongated groove region including the plurality of first grooves and a second elongated groove region including the plurality of second grooves are respectively strip-shaped in a common extension direction and are alternately arranged, and wherein a bisector on an angle formed between the first direction and the second direction is at least substantially parallel to the common extension direction of the first elongated groove region and the second elongated groove region.

16. The display unit of claim 15, wherein the angle formed between the first direction and the second direction is a right angle.

* * * * *